(12) United States Patent
Abe

(10) Patent No.: US 7,472,205 B2
(45) Date of Patent: Dec. 30, 2008

(54) COMMUNICATION CONTROL APPARATUS WHICH HAS DESCRIPTOR CACHE CONTROLLER THAT BUILDS LIST OF DESCRIPTORS

(75) Inventor: Shinji Abe, Tokyo (JP)

(73) Assignee: NEC Corporation, Tokyo (JP)

( * ) Notice: Subject to any disclaimer, the term of this patent is extended or adjusted under 35 U.S.C. 154(b) by 861 days.

(21) Appl. No.: 10/417,146

(22) Filed: Apr. 17, 2003

(65) Prior Publication Data

US 2004/0024915 A1   Feb. 5, 2004

(30) Foreign Application Priority Data

| Apr. 24, 2002 | (JP) | ............................. 2002-121738 |
| May 27, 2002 | (JP) | ............................. 2002-152826 |
| May 27, 2002 | (JP) | ............................. 2002-152827 |

(51) Int. Cl.
*G06F 13/28* (2006.01)
(52) U.S. Cl. .................. 710/22; 710/7; 710/9; 710/25; 710/38; 710/62
(58) Field of Classification Search .................... 710/22
See application file for complete search history.

(56) References Cited

U.S. PATENT DOCUMENTS

| 5,926,841 | A * | 7/1999 | Novak et al. ................. 711/208 |
| 6,216,199 | B1 * | 4/2001 | DeKoning et al. ............. 711/3 |
| 6,578,131 | B1 * | 6/2003 | Larson et al. ................ 711/216 |
| 7,133,940 | B2 * | 11/2006 | Blightman et al. ............ 710/22 |
| 2004/0062267 | A1 * | 4/2004 | Minami et al. ............... 370/463 |

FOREIGN PATENT DOCUMENTS

| JP | 60-3229 | A | 1/1985 |
| JP | 6-83733 | A | 3/1994 |
| JP | 6-216970 | | 8/1994 |
| JP | 6-224910 | A | 8/1994 |
| JP | 7-023060 | | 1/1995 |
| JP | 7-23060 | A | 1/1995 |
| JP | 9-284340 | A | 10/1997 |
| JP | 11-234331 | A | 8/1999 |
| JP | 11-265328 | A | 9/1999 |
| JP | 11-282813 | A | 10/1999 |
| JP | 2000-259523 | A | 9/2000 |
| JP | 2001-127767 | A | 5/2001 |
| JP | 2005-184051 | | * 7/2005 |

* cited by examiner

*Primary Examiner*—Niketa I Patel
*Assistant Examiner*—Brooke J Dews
(74) *Attorney, Agent, or Firm*—Foley & Lardner LLP

(57) ABSTRACT

A communication controller of the present invention includes a descriptor cache mechanism which makes a virtual descriptor gather list from the descriptor indicted from a host, and which allows a processor to refer to a portion of the virtual descriptor gather list in a descriptor cache window. Another communication controller of the present invention includes a second processor which allocates any communication process related with a first communication unit of the communication processes to the first one of a first processors and any communication process related with a second communication unit of the communication processes to the second one of the first processors. Another communication controller includes a first memory which stores control information. The first memory includes a first area accessed by the associated one of processors to refer to the control information and a second area which stores the control information during the access.

3 Claims, 32 Drawing Sheets

DESCRIPTOR CACHE MEMORY 108 MAPPING

| CONNECTION #N<br>RECEIVE DESCRIPTOR CACHE WINDOW |
| --- |
| CONNECTION #N<br>SEND DESCRIPTOR CACHE WINDOW |
| CONNECTION #N<br>SEND COMPLETION<br>DESCRIPTOR CACHE WINDOW |
| ⋮ |
| CONNECTION #1<br>RECEIVE DESCRIPTOR CACHE WINDOW |
| CONNECTION #1<br>SEND DESCRIPTOR CACHE WINDOW |
| CONNECTION #1<br>SEND COMPLETION<br>DESCRIPTOR CACHE WINDOW |
| CONNECTION #0<br>RECEIVE DESCRIPTOR CACHE WINDOW |
| CONNECTION #0<br>SEND DESCRIPTOR CACHE WINDOW |
| CONNECTION #0<br>SEND COMPLETION<br>DESCRIPTOR CACHE WINDOW |

Fig.5

| PCB ID | S | D | W | PHYSICAL ADDRESS | OFFSET |

S : START/BUSY

D : DIRECTION (RECEIVE=00B,SEND=01B,SEND COMPLETION=1×B)

W : WINDOW SLIDE MODE (DIRECT=0B,NUMERIC=1B)

OFFSET : NUMERIC SLIDE SIZE

Fig.7

| SECONDARY VALID | SECONDARY PCBID | SECONDARY PROCESSING TYPE | PRIMARY VALID | | PRIMARY PCBID | PRIMARY PROCESSING TYPE |
|---|---|---|---|---|---|---|
| V | | | | V | | |

| | |
|---|---|
| ENTRY #0 | PCBID #0 |
| ENTRY #1 | PCBID #1 |
| ENTRY #2 | PCBID #2 |
| ENTRY #3 | PCBID #0 |
| ENTRY #4 | PCBID #0 |
| ENTRY #5 | PCBID #3 |
| ENTRY #6 | PCBID #5 |
| ENTRY #7 | PCBID #0 |

| OPU #0 PRIMARY STATUS | OPU #0 SECONDARY STATUS |
|---|---|
| OPU #1 PRIMARY STATUS | OPU #1 SECONDARY STATUS |
| OPU #2 PRIMARY STATUS | OPU #2 SECONDARY STATUS |
| OPU #3 PRIMARY STATUS | OPU #3 SECONDARY STATUS |

COMMUNICATION CONTROL APPARATUS WHICH HAS DESCRIPTOR CACHE CONTROLLER THAT BUILDS LIST OF DESCRIPTORS

BACKGROUND OF THE INVENTION

1. Field of the Invention

The present invention relates to a communication controller and in particular to a communication controller connected between a network and a host.

2. Description of the Prior Art

Network servers have performed processes involved in communications over a network such as the Internet. Transmission Control Protocol/Internet Protocol (TCP/IP) used as a communication protocol in the Internet places heavy load for processing the protocol on the network server host.

To solve the problem, there is a method in which a number of communication controllers are provided between the host and the network for performing part of TCP/IP processing, thereby reducing the load on the host.

When the communication controller transfers received packets to a host memory, they require descriptors provided by the host central processing unit (CPU). The descriptors represent the address and size of a receive buffer in the host. Typically, descriptors take the form of a chain. The communication controller follows the descriptor chain to read descriptors to perform communication processing.

Difficulties arise in especially offloading processing relating to a connection-oriented protocol such as TCP. Communication processing for such a protocol involves resending of packets and ACK (ACKnowledge) packet processing. Therefore, the communication controller must not only read ahead descriptors along the descriptor chain, but also read previous descriptors in order to perform the communication processing.

Furthermore, when "zero-copy" data transfer is performed in which a received packet is directly transferred into a user data space in order to improve the performance of network processing, as many description chains as TCP connections are required. This adds complexity to descriptor control. Therefore, a technology for speeding up descriptor access control in addition to ensuring ease of descriptor control for the network processor unit in the communication controller.

Prior-art documents describing such technologies include Japanese Patent Laid-Open No. 6-216970 and Japanese Patent Laid-Open No. 7-023060. A communication control adaptor disclosed in Japanese Patent Laid-Open No. 6-2169710 independently generates and sends an acknowledge frame without receiving any request to send an acknowledge frame from its host system so that it can quickly send back the acknowledge frame to the host. However, the prior-art technology is totally different from the present invention in configuration and effect because the prior-art technology does not control descriptors.

A buffer conversion control method disclosed in Japanese Patent Laid-Open No. 7-023060 provides a sending and receiving buffer management conversion table between a buffer management table managed by a protocol controller and a sending and receiving descriptor table managed by a LAN (Local Area Network) controller to allow a sending and receiving buffer to be shared between a LAN adaptor (equivalent to a communication controller of the present invention) and a communication controller (equivalent to a host of the present invention). However, the prior-art method is totally different from the present invention in configuration and effect because the prior-art method does not allow descriptors managed by a host to be cached in the communication controller.

Moreover, prior-art communication controllers have the problem that the processing concerning sending and receiving data to and from a network takes long time because a single processor performs the processing. If the sending and receiving processing to and from the network were distributed among a plurality of processors, the sending and receiving processing for the same connection dispatched to the different processors would require resource contention avoidance and coherency maintenance, thereby increasing complexity of and delay in the processing.

Furthermore, if a communication controller is connected to a fast network such as a Gigabit Ethernet network or has a plurality of ports, more dispatches must be performed in a short period of time and fast dispatch is required.

On the other hand, when a prior-art communication controller performs processing for sending and receiving packets, it must refer to context information defined for each connection. The context information is required for maintaining sending and receiving processing between connections and referred to by a network processor each time packet processing is performed.

Context information typically has a size ranging from as large as 128 bytes to 1K bytes depending on types of protocol. Moreover, the context information is frequently accessed by the network processor. Prior-art communication controllers cannot achieve fast access to such context information and low latency because they obtain necessary context information from a host each time they requires it. Furthermore, as many pieces of context information as connections supported by a communication controller are required. If a large number of connections are supported and connection processing load is distributed among a plurality of network processors in a prior-art communication controller, the performance of the controller is degraded due to load on or contention for memory holding context information.

BRIEF SUMMARY OF THE INVENTION

An object of the present invention is to provide a communication controller and a communication control method that can reduce descriptor control overhead in a network processor unit by eliminating the need for the network processor unit to scan a chain of descriptors scattered over a host memory.

Another object of the present invention is to provided a communication controller and a communication control method that reduce descriptor access delays by causing required descriptors to be read into a descriptor cache whenever the need arise for a network processor unit to refer the descriptors, to perform sending or receiving processes.

Yet another object of the present invention is to provide a communication controller and a communication control method that dispatch sending and receiving processes to a plurality of processors.

Yet another object of the present invention is to provide a communication controller and a communication control method that can dispatch sending and receiving processes involved in the same connection, with consistency being maintained.

Yet another object of the present invention is to provide a communication controller and a communication control method that can fast dispatch sending and receiving processes to a plurality of processors.

Yet another object of the present invention is to provide a communication controller and a communication method that can fast obtain context information.

Yet another object of the present invention is to provide a communication controller and a communication control method that can prevent contention for access to a memory storing context information.

According to one aspect of the present invention, a communication controller, which is connected to a host through an I/O bus and which controls network media on the basis of a descriptor indicated from the host to communicate a packet, is provided which includes: a processor which performs communication processes; and a descriptor cache mechanism which makes a virtual descriptor gather list by following and analyzing a descriptor chain in a host memory from the descriptor indicted from the host, and which allows the process or to refer to a portion of the virtual descriptor gather list in a descriptor cache window.

According to another aspect of the present invention, a communication controller, connected to a host through an I/O bus for controlling network media on the basis of a descriptor indicated from the host to communicate a packet, is provided which includes: a MAC controller which controls the network media to send and receive a packet; an I/O bus controller which controls transmission between an I/O bus and the communication controller; a DMA controller which performs data transfer to and from a host memory through the I/O bus controller; a descriptor cache memory in which descriptors in a descriptor chain in the host memory are cached as a portion of a virtual descriptor gather list; a descriptor cache controller which makes a virtual descriptor gather list by following and analyzing a descriptor chain in the host memory from the descriptor indicted from the host, and which allows a portion of the virtual descriptor gather list to be referred to in a descriptor cache window; and a network processor element which transfers a received packet to the host memory through the I/O bus controller by obtaining the address of a location in the host memory, in which the received packet is to be stored, from a receive descriptor provided by the descriptor cache controller and by indicating the address to the DMA controller to activate a DMA write operation, and which sends a send packet by obtaining the address of the send packet in the host memory, in which the send packet is stored, from a send descriptor provided by the descriptor cache controller and by indicating the address to the DMA controller.

According to another aspect of the present invention, a descriptor control method for a communication controller, connected to a host through an I/O bus for controlling network media on the basis of a descriptor indicated from the host to communicate a packet, is provided which includes: building a virtual descriptor gather list for each connection by following and analyzing a descriptor chain; and accessing descriptors required for the packet communication by referring to a portion of the virtual descriptor gather lists as a descriptor cache window.

According to another aspect of the present invention, a communication controller, connected between a network and a host which performs communication over the network, is provided which includes: a plurality of first processors (110) which performs communication processes between the network and the host; and a second processor (120) which allocates the communication processes to the plurality of first processors, wherein the second processor allocates any communication process related with a first communication unit of the communication processes to the first one of the first processors and any communication process related with a second communication unit of the communication processes to the second one of the first processors.

According to another aspect of the present invention, a communication controller, connected between a network and a host which performs communication over the network, is provided with includes: a plurality of first processors (110) which performs communication processes for packets between the network and the host; a second processor (120) which allocates the communication processes to the plurality of first processors; and a first memory which is associated with the corresponding one of the first processors and which stores control information, the control information being generated in the host for each communication unit of the packets and used for the communication processes; wherein the first memory includes a first area accessed by the associated one of the first processors to refer to the control information and a second area which stores the control information during the access.

BRIEF DESCRIPTION OF THE DRAWINGS

Other features and advantages of the invention will be made more apparent by the following detailed description and the accompanying drawings, wherein:

FIG. 5 shows mapping of a descriptor cache memory shown in FIG. 2;

FIG. 7 shows information in a descriptor cache control register in the descriptor cache controller shown in FIG. 2;

FIG. 17 shows a dispatch queue register 11022 according to the present invention;

FIG. 22 shows an Rx queue register 1215 according to the present invention;

FIG. 23 shows an OPU status register 1216 according to the present invention;

In the drawings, the same reference numerals represent the same structural elements.

DETAILED DESCRIPTION OF THE PREFERRED EMBODIMENTS

A first embodiment of the present invention will be described in detail below.

Figure 1:
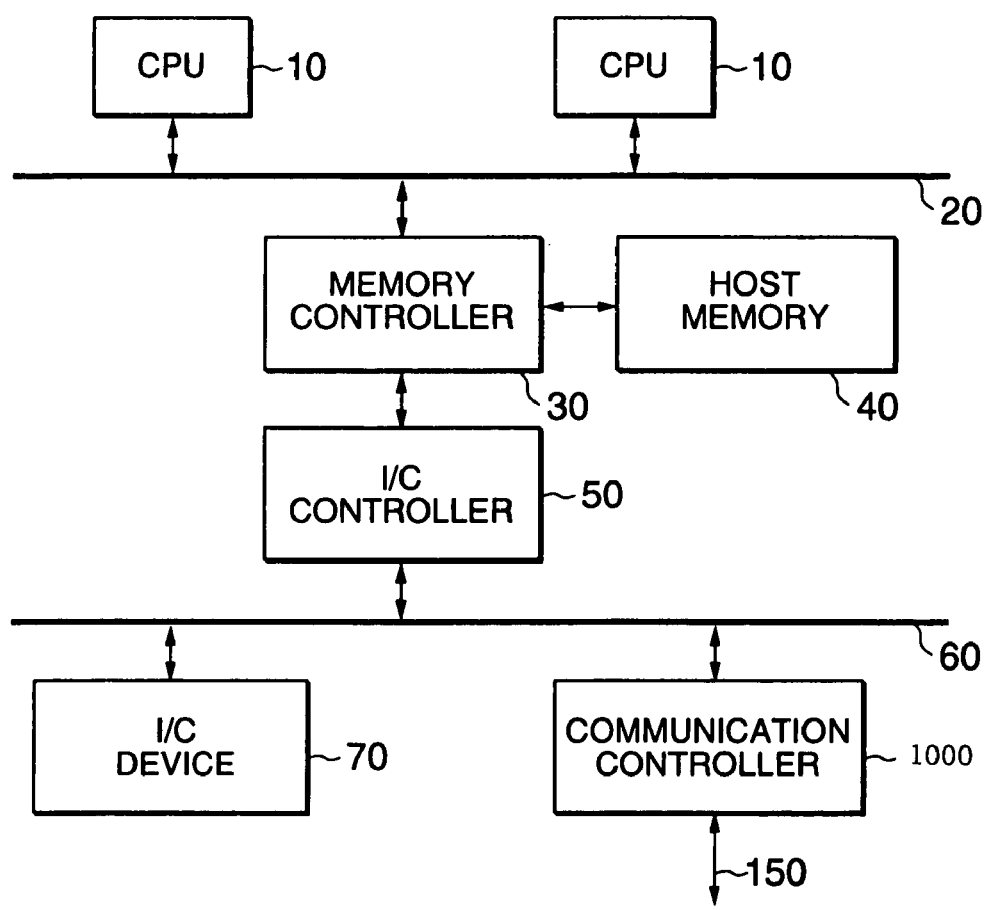
FIG. 1 is a circuit block diagram showing a first embodiment of the present invention.

Referring to FIG. 1, a system including a communication controller 1000 has at least one central processing unit (CPU) 10, a processor bus 20, a memory controller 30, a host memory 40, an input/output (I/O) controller 50, an I/O bus 60, and an I/O device 70, in addition to the communication controller 1000.

At least one CPU 10 is connected to the memory controller 30 through the processor bus 20. According to an embodiment, two CPUs 10 are connected to the processor bus 20. The memory controller 30 controls transmission between the host memory 40 and the I/O controller 50. One or more I/O devices 70 are connected to the I/O controller through the I/O bus 60. The communication controller 1000 is connected to the I/O bus 60. The communication controller 1000 controls network media 150 such as a local area network (LAN) complying with a standard such as Ethernet®. The communication controller 1000 is a kind of I/O device. The upper side above the I/O bus 60 of the basic system will be sometimes hereinafter simply called the host.

This system is illustrative only and the communication controller of the present invention does not depend on the host. The system provided by way of example may be a personal computer, workstation, or server system. The I/O bus 60 may be a Peripheral component Interconnect (PCI) bus or a PCI-X bus. The network media 150 may be an Ethernet® network, a Gigabit Ethernet network, or a wireless LAN or the Internet.

Figure 2:
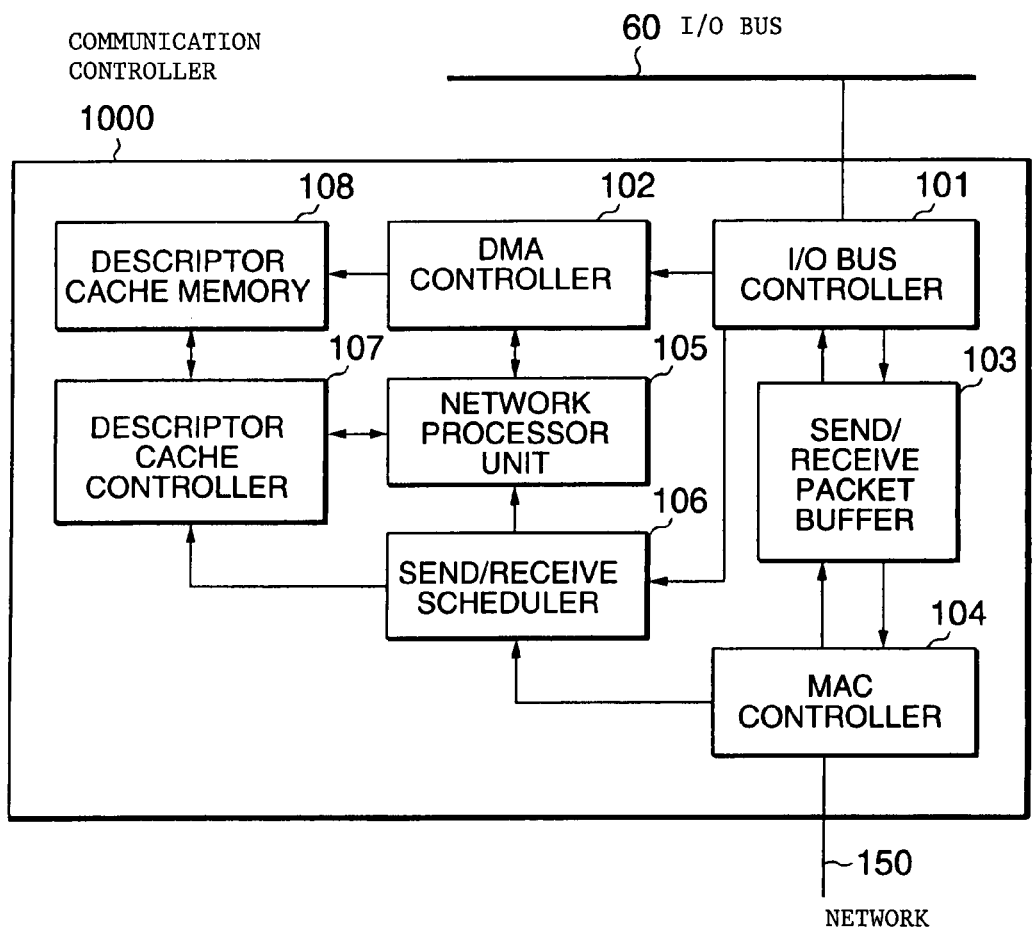
FIG. 2 is a circuit block diagram showing a configuration of a communication controller according to the first embodiment of the present invention.

FIG. 2 is a circuit block diagram showing a configuration of the communication controller 1000. The communication controller 1000 includes a MAC (Media Access Control) controller 104 for controlling the network media 150 to send and receive packets, a sending/receiving packet buffer 103 for storing received packets and packets to be sent, an I/O bus controller 101 for controlling transmission between the I/O bus 60 and the communication controller 101, a DMA (Direct Memory Access) controller 102 for transferring data to and from the host memory 40 through the I/O bus controller 101, a sending/receiving scheduler 106 for scheduling sending and receiving packets, a network processor unit 105 for performing processes such as analysis of received packet, activation of data transfer to the host memory 40, activation of send data transfer, and sending processes for the send data, a descriptor cache controller 107 for controlling a descriptor cache mechanism, and a descriptor cache memory 108 for caching descriptors.

Figure 3:
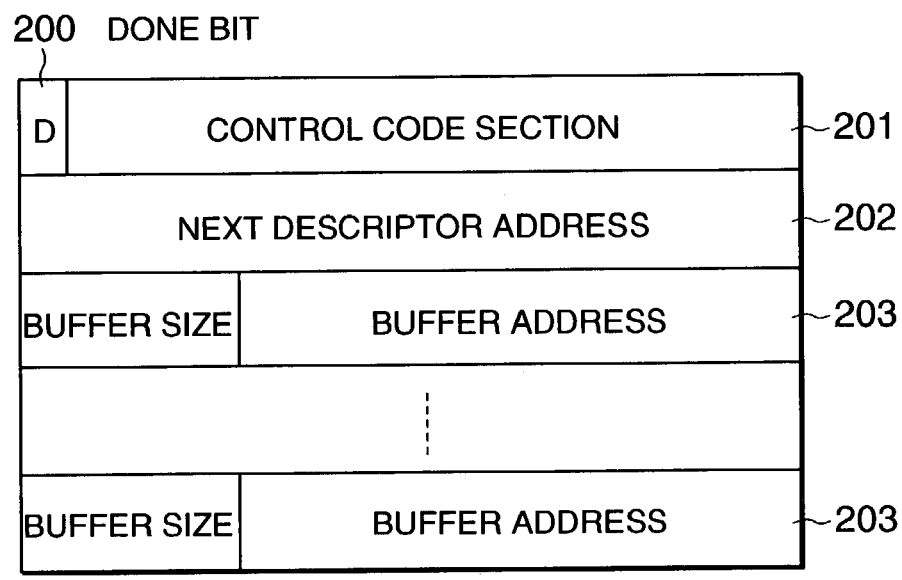
FIG. 3 shows a format of a descriptor according to a first embodiment of the present invention.

FIG. 3 shows an exemplary format of a descriptor generated by the CPU of the host. The descriptor consists of a done bit 200 indicating to the host that the descriptor is consumed, a control code section 201 for setting attributes of the descriptor, a next descriptor address 202 which is the address pointer to the next descriptor in a descriptor chain, and a plurality of pairs of a buffer address indicating an address of a location in which a received packet is stored if this is a receive descriptor, or a location in which data to be sent as a packet is stored if this is a send descriptor, and a buffer size. The CPU 10 of the host generates a send or receive descriptor in the host memory 40. When a packet is received, the network processor unit 105 refers to the descriptor and transfers the received packet data to the host memory 40. Then, the network processor unit 105 sets a done bit 200 through the DMA controller 102 on a DMA write. The host refers to the done bit 200 in response to an interrupt, recognizes the completion of the descriptor, and performs a process corresponding to send or receive.

Figure 4:
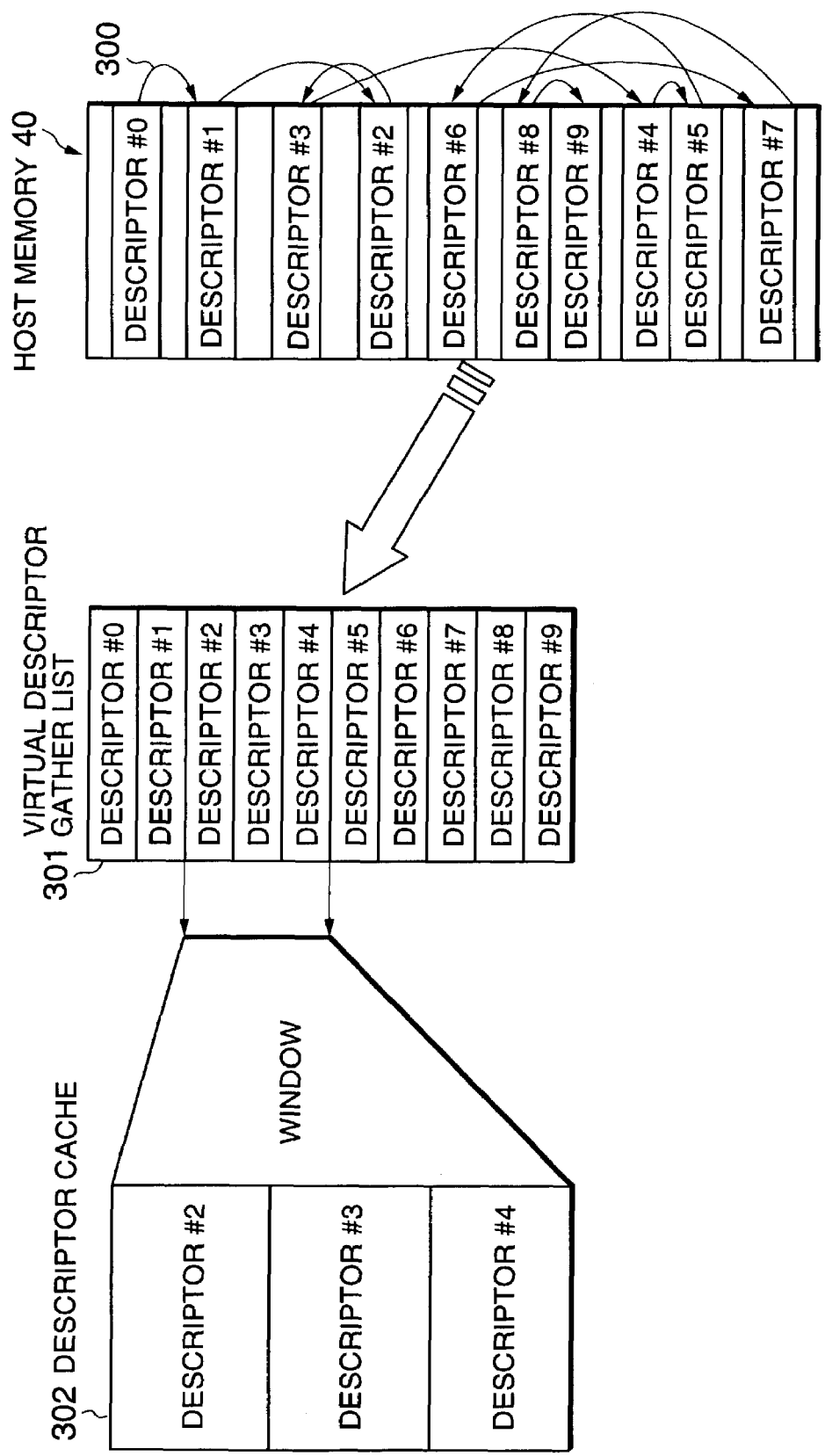
FIG. 4 is a conceptual diagram of a descriptor cache mechanism according to the first embodiment of the present invention.

FIG. 4 illustrates a concept of the descriptor cache mechanism according to the present invention. Descriptors generated by the host form a descriptor chain in the host memory 40. The physical locations in which they are stored are scattered or fragmentary (as indicated by reference number 300). The descriptor cache controller 107 automatically follows the descriptor chain to build a virtual descriptor gather list 301. The virtual descriptor gather list 301 is not a physical but a virtual entity.

The size of the descriptor cache is determined by the relationship between the capacity of the descriptor cache memory 108 and the total number of connections supported by the communication controller 1000. Therefore, apart of the virtual descriptor gather list 301 that is equivalent to cache size per connection is actually cached in the descriptor cache memory 108.

The network processor unit 105 can refer to the cached part of virtual descriptor gather list 301 as a concept of a window. Reference number 302 indicates a window for a single connection.

The window is merely memory of the size allocated to that connection. For example, suppose that 2 kilobytes (KB) is allocated to the window. The descriptor cache controller 107 reads descriptors indicated by the host and stores it in the descriptor cache. In so doing, the descriptor cache controller 107 refers to the next descriptor address 202 to obtain the address of the subsequent descriptor and further reads a number of descriptors equivalent to 2 KB. As a result, the 2 KB-part of virtual descriptor gather list 301 that is made of a descriptor chain contained in the descriptor cache appears as if it were a window to the network processor unit 105.

Two windows, a receive descriptor cache window for caching receive descriptors and a send descriptor window for caching send descriptors, are constructed per connection.

For a connection-oriented protocol such as TCP, transmission ends with an ACK packet sent from the other party of the communication. The same send descriptors previously referred to must be referred to again. Therefore, a send completion descriptor cache window, which differs from the send descriptor window in position, is built. There are as many descriptor cache window sets consisting of these three types of descriptor cache windows as the number of connections supported by the communication controller 1000. They are mapped to the descriptor cache memory 108 as shown in FIG. 5.

The network processor unit 105 can read a descriptor cache window for any connection at an address specified in the descriptor cache memory 108. The format of a descriptor return to the network processor unit 105 is as shown in FIG. 6.

Figure 6:
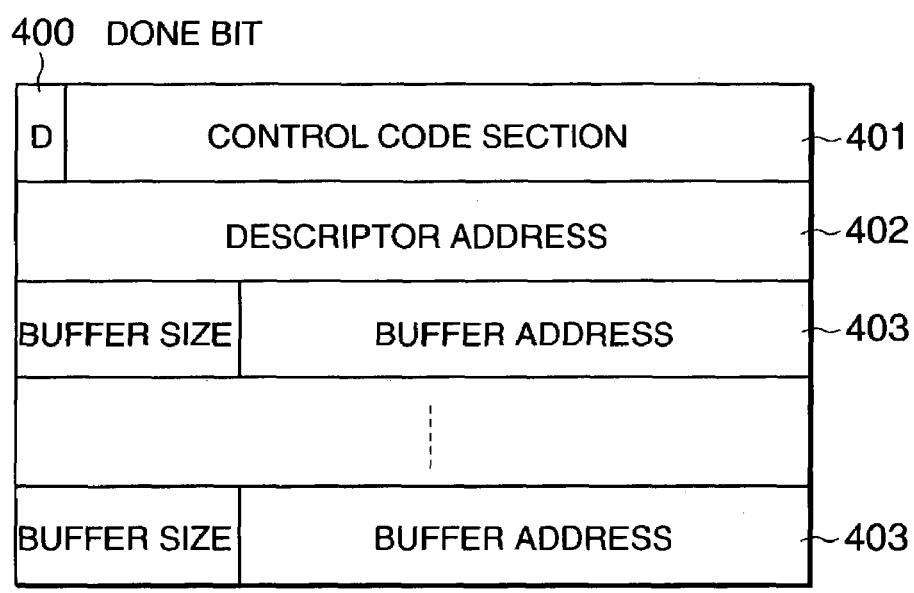
FIG. 6 shows a format of a descriptor in the descriptor cache according to the first embodiment of the present invention.

The descriptor shown in FIG. 6 consists of a done bit 400 for indicating to the host that the descriptor is consumed, a control code section 401 for setting attributes of the descriptor, a descriptor address 402 indicating the physical address of the descriptor, and a plurality of pairs of a buffer address indicating the address of a location in which a receive packet is stored if this is a receive descriptor or a location in which a packet to be sent is stored if this is a send descriptor, and a buffer size. The descriptor differs from the descriptor shown in FIG. 3 that is generated by the host in that a part indicated by reference number 402 indicates the physical address of the descriptor itself. The physical address of the descriptor is necessary for the network processor unit 105 to write an end status into the host memory 40 after the descriptor is used.

This eliminates the need for the network processor unit 105 to follow a descriptor chain in the host memory 40. The network processor unit 105 can automatically read any descriptors simply by controlling the position of windows.

The descriptor cache controller 107 internally holds the next descriptor address of the next address to which the current descriptor is chained. The descriptor chain is automatically followed to cache descriptors.

Each window is controlled by means of a descriptor cache control register shown in FIG. 7. The descriptor cache control register has a PCB (Protocol Control Block) ID (Identification) field indicating a connection number, a start/busy bits which indicates activation of a direction to slide a window and is reset after the completion of the window control, a direction field D used to select one of the send descriptor window, the receive descriptor window, and the send completion window, a bit W used for selecting a numeric window slide mode or a direct window slide mode, a physical address filed used for setting the physical address of the descriptor which is to be specified during the operation under the direct window slide mode, and an offset field used for setting a slide size during the operation under the numeric window slide mode.

The descriptor cache mechanism has the numeric window slide mode and the direct window slide mode, which differs from each other in behavior.

Figure 8:
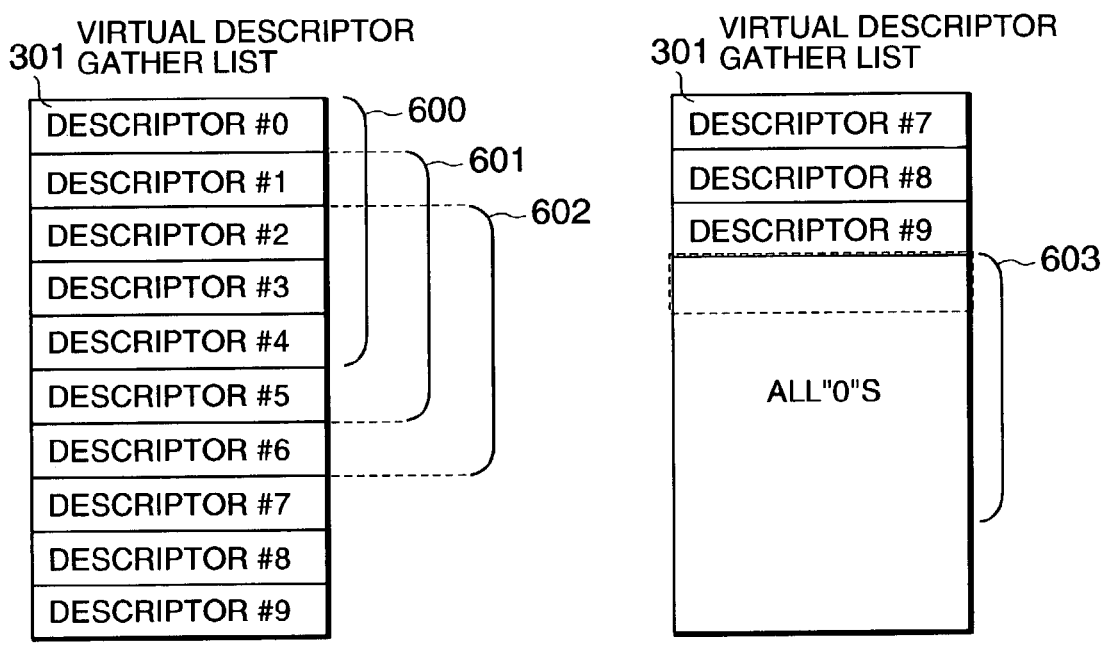
FIG. 8 shows numeric window slide mode according to the first embodiment of the present invention.

FIG. 8 shows the numeric window slide mode. In the numeric window slide mode, a window is slid down by a specified number of descriptors. Bold lines indicate windows in the virtual descriptor gather list 301 that can be referred to by the network processor unit 105. Reference numbers 600 to 602 indicate how descriptors are consumed and windows are slid by means of the descriptor cache control register each time a packet is sent or received. The numeric window slide mode is a window control mode appropriate for a connection less protocol such as Ethernet®/IP Raw/UDP that allows descriptors to be consumed immediately after the completion of sending or receiving (the term "consume" is used to mean that a process for indicating descriptors in the communication controller 1000 has been completed and the completion is indicated to the host) and those descriptors are nevermore referred to. After descriptors run out 603, the descriptor cache controller 107 returns an all-zero descriptor.

Figure 9:
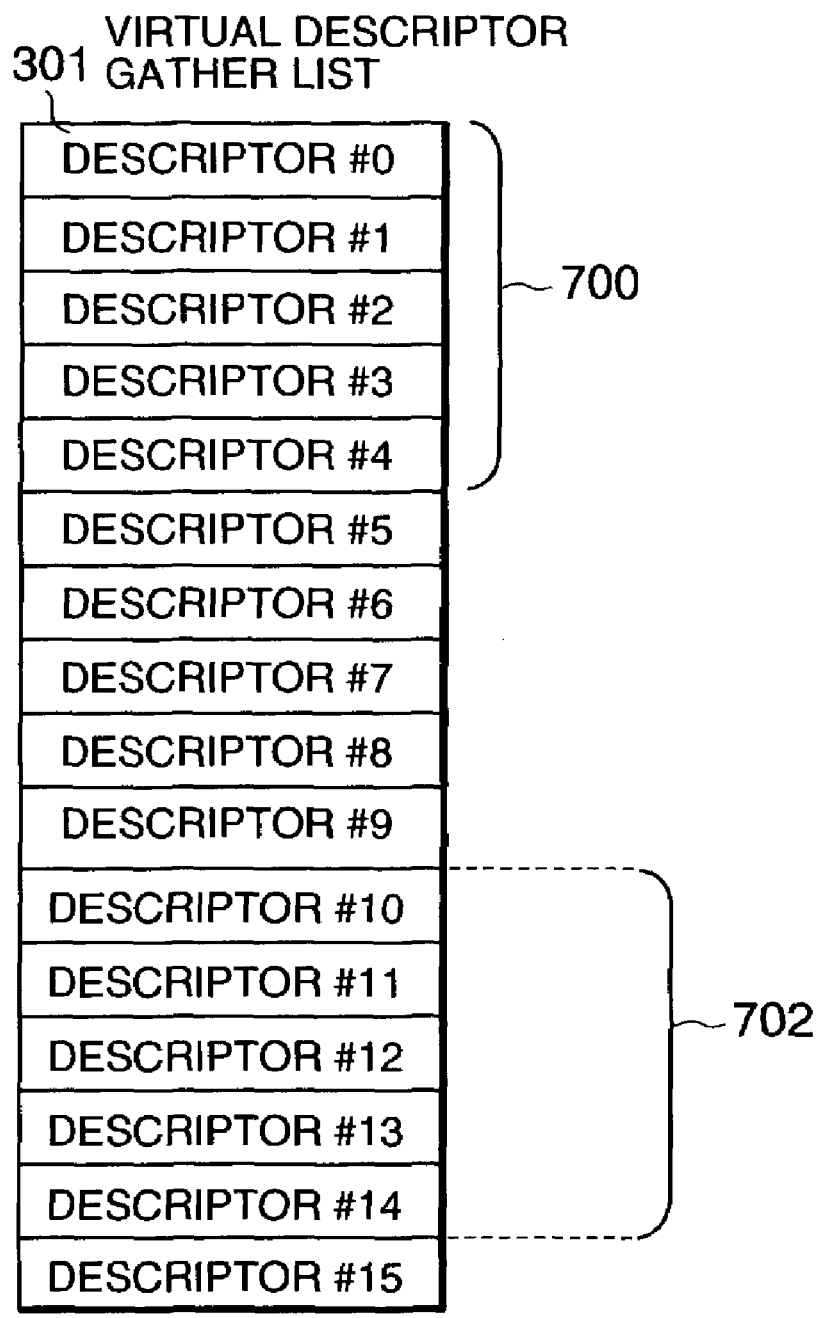
FIG. 9 shows direct window slide mode according to the first embodiment of the present invention.

FIG. 9 shows the direct window slide mode. This mode will be described with respect to sending packets by way of example. Suppose that a window has been slid from window position 700 to window position 702 in the numeric window slide mode and packets have been sent. However, a packet can be lost due to some failure on the network. A request for resending the packet may be issued from the destination of the packets (remote host). For example, if resending of the packet indicated by descriptor #0 in FIG. 9 is requested, the network processor unit 105 can specify the direct window slide mode and the physical address of descriptor #0 in the descriptor cache control register to directly move the beginning of the window to the beginning of descriptor #0. After resending the packet, it can move the window back to the window position 702 of descriptor #10 in the direct window slide mode and continue transmission. Thus, the direct window slide mode is a window control method appropriate to a connection-oriented protocol such as TCP that provides requests for resending.

Another characteristic of connection-oriented protocols is that an ACK packet is provided for indicating a send packet is received at the destination. In a connection-oriented-protocol network, transmission of packets is not completed only by sending packets over the network but by returning an ACK packet from the receiving party indicating that a corresponding packet is received. Therefore, the consumption of descriptors is being suspended from the end of the transmission until the ACK packet is returned. However, descriptors the consumption of which is suspended would be out of a window because the window is slid along descriptors in sequence during the transmission process. If the window were slid back after the reception of the ACK packet, descriptor cache flushing would frequently occur, significantly reducing the efficiency of the cache. To avoid this, a separate, send completion descriptor cache window is provided in the sending unit.

Figure 10:
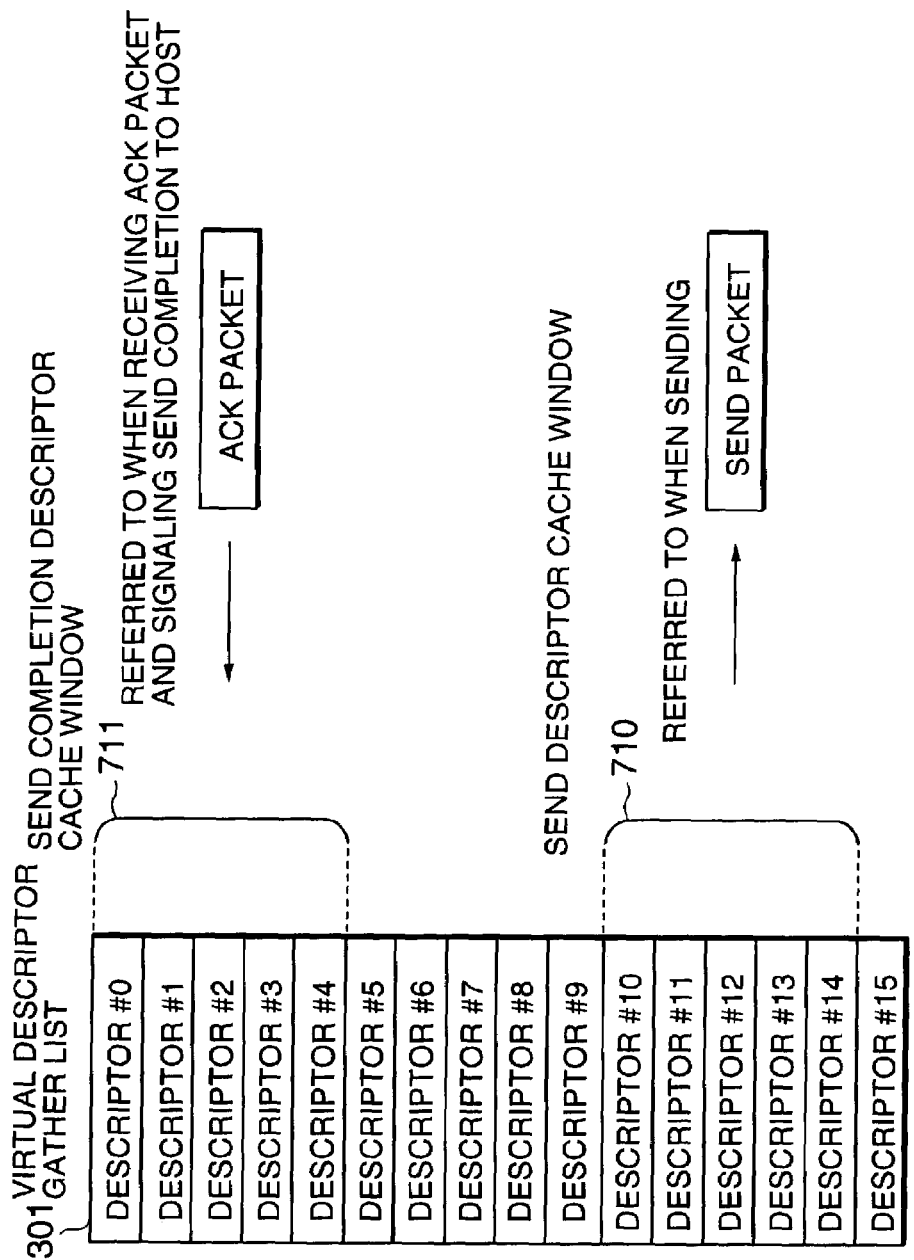
FIG. 10 is a conceptual diagram of a send completion descriptor cache window according to the first embodiment of the present invention.

FIG. 10 shows a relationship between a send descriptor cache window 710 and a send completion descriptor cache window 711. The send descriptor cache window 710 is kept moving in the numeric window sliding mode during transmission in which no resending occurs. On the other hand, the send completion descriptor cache window 711 is a window that enables reference to unconsumed descriptors for which transmission has been completed but the completion has not yet been reported to the host. The network processor unit 105 refers to this window to report completion of transmission to the host each time it receives an ACK packet. The transmission completion descriptor cache window 711 allows send descriptors to be efficiently cached.

Figure 11:
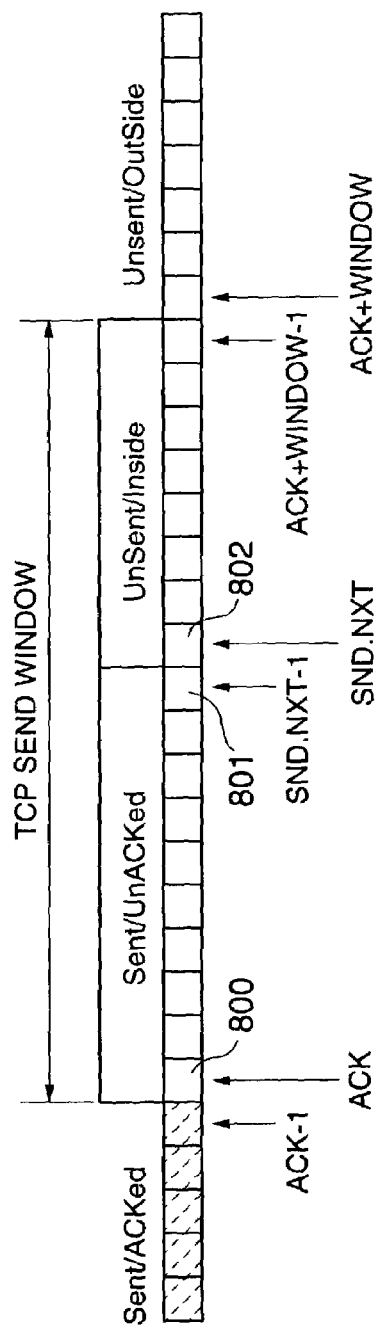
FIG. 11 shows an example of a send window in TCP.

FIG. 11 shows the concept of a sliding window for sending packets in a typical TCP network. The term "TCP sliding window" is a TCP/IP term and refers to a concept completely different from that of the descriptor cache window according to the present invention. Each box in FIG. 11 represents each descriptor. Sent/ACKed indicate descriptors of packets that have been already sent, for which an ACK packet has been received, and the completion of transmission of which has been reported to the host. Therefore, the network processor unit 105 does not need to refer to the descriptors in this region. Sent/UnACKed indicate descriptors of packets that have been already sent, but for which no ACK packet has been received from the receiving party. The network processor unit 105 should store at least the addresses of descriptors 800 to 801 in order to examine to which descriptors the next ACK packet received corresponds and signal to the host the completion of transmission of the corresponding descriptors. UnSent/Inside indicates that a TCP send window indicated by the receiving party contains descriptors of unsent packets. The network processor unit 105 sends packets from SND.NXT to ACK +Window−1. The network processor unit 105 must store the address of descriptor 802 at the send point SND.NXT.

Figure 12:
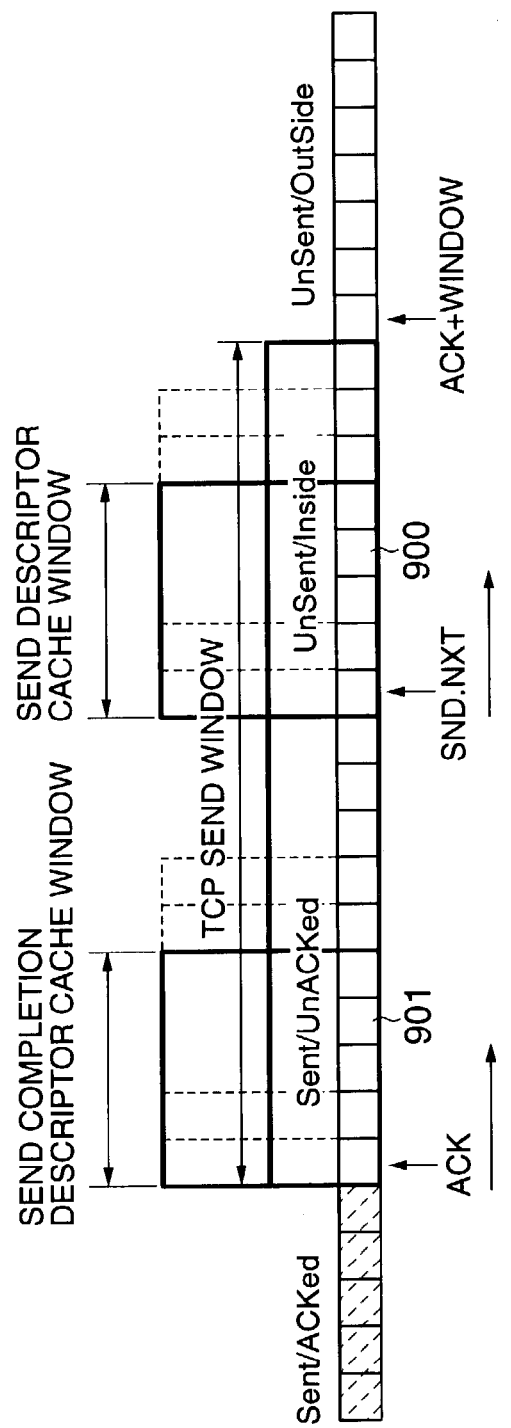
FIG. 12 shows an example of operation of the TCP send window shown in FIG. 11 and descriptor cache windows.

FIG. 12 shows a sending sequence of send packets in an actual TCP network. The network processor unit 105 reads sequentially descriptors in a send descriptor cache window 900 in the numeric window slide mode to send packets to the extent that the receiving party can receive. When the network processor unit 105 has received an ACK packet from the receiving party, it refers to a send completion descriptor cache window 901 to read and consume appropriate descriptors. The send completion descriptor cache window 901 read descriptors that the send descriptor cache window 900 followed in the past. If no packet is lost in the network, both of the descriptor cache windows are slid only in numeric window slide mode.

Providing the three distinctive descriptor cache windows for receive, send, and send completion in the descriptor cache mechanism in the communication controller 100 as described above eliminates the need for the network processor unit 105 to follow a chain of descriptors scattered over the host memory 40, allowing the network processor unit to perform other communication processing processes. Furthermore, the descriptor cache windows are created so as to accommodate processing for various protocols such as connection less and connection-oriented, leading to simplified firmware in the network processor unit 105.

Details of operation of the communication controller 1000 thus configured according to the first embodiment of the present invention overlap those of a communication controller 1001 according to a second embodiment, which will be described below, and are therefore omitted here.

The descriptor cache mechanism of the communication controller 1000 according to the first embodiment has as many descriptor cache window sets as connections supported by the communication controller. In order to improve performance, it is desirable that descriptors for each connection should have been cached when they are required by the network processor unit 105. For example, unlike send descriptors, receive descriptors are not necessarily required immediately but are referred to only when packets are received. If descriptors were cached each time they are indicated by the host, load on the I/O bus 60 between the host and the communication controller 1000 would increase and consequently a band of the bus intended to be used for sending and receiving packet data would be used for reading descriptors.

Next, a second embodiment of the present invention will be described in detail.

Figure 13:
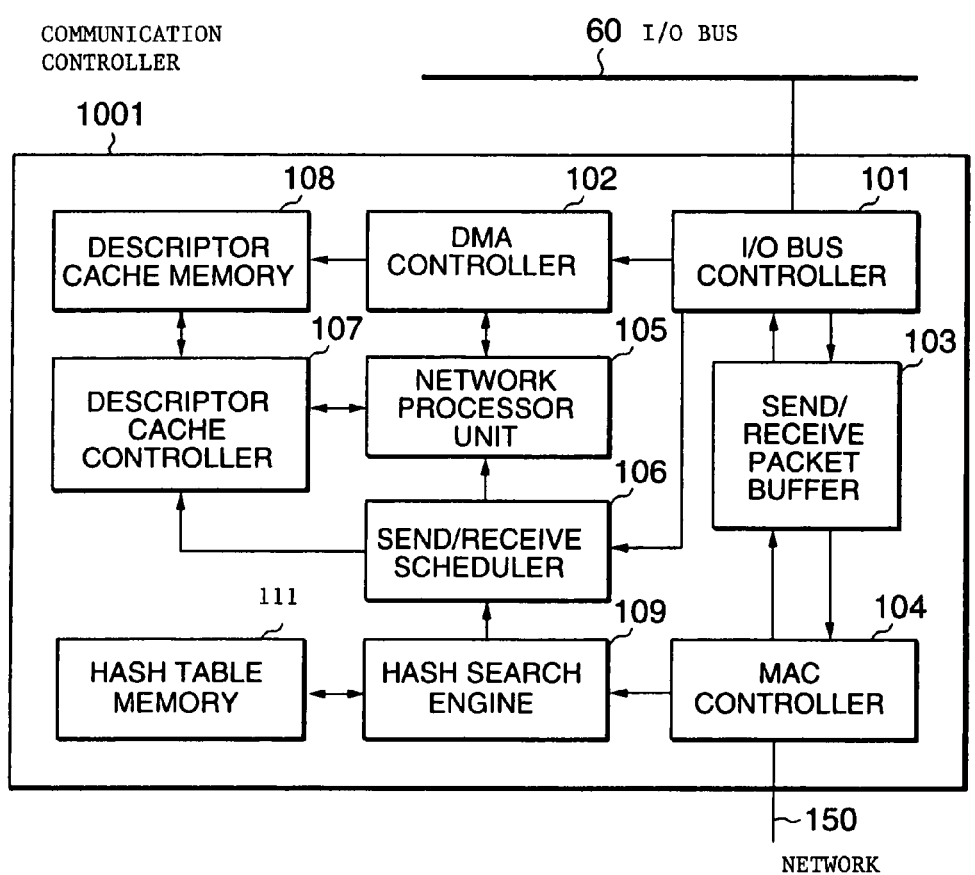
FIG. 13 is a block diagram showing a configuration of a communication controller according to a second embodiment of the present invention.

FIG. 13 is a circuit block diagram showing a configuration of a communication controller 1001 according to the second embodiment of the present invention. The communication controller 1001 according to the second embodiment has a configuration similar to that of the communication controller 1000 shown in FIG. 1, except that a hash search engine 109 and a hash table memory 110 are added so that descriptors associated with a connection can be read only when they are required. In addition, a mechanism for prefetching descriptors is provided in its descriptor cache controller 107. As such, the circuit block diagram of a system according to the second embodiment of the invention is similar to the diagram of a system according to the first embodiment of the invention shown in FIG. 1, except that the communication controller 1000 is replaced by the communication controller 1001.

Immediately after the host indicates send descriptors to the descriptor cache controller 107, the descriptor cache controller 107 starts to prefetch the send descriptors. Indication of the send descriptors means that packets will be sent. In the case of sending, therefore, the descriptors are cached each time they are notified. In the case of reception, the descriptor cache controller 107 activates prefetch of receive descriptor when the hash search engine 109 identifies a connection. In particular, the hash search engine 109 signals the connection to the descriptor cache controller 107 through the send/receive scheduler 106. The descriptor cache controller 107 actually controls the descriptor cache to generate an actual prefetch request to issue a read onto the I/O bus 60 through the DMA controller 102.

The host stores hash matching patterns (hash patterns) such as MAC addresses, IP addresses, and Port IDs in the hash table memory 110 in advance through a network processor unit 105 in order to identify a connection such as an Ethernet, IP, UDP, or TCP connection.

When a MAC controller 104 receives a packet, it extracts an address such as a MAC address of IP address from the header of the packet it received and provides it as a pattern to the hash search engine 109.

The hash search engine 109 uses hashing to search through the hash table memory 110 to identify a connection on the basis of the pattern provided and provides the connection number (PCB ID) of the connection to the descriptor cache controller 107. The hash search is a type commonly used. Parameters for each protocol are extracted from the header of a packet, the address is calculated by use of a hash operation, and the calculated address is matched with the provided pattern which is read from the hash table memory 110.

The descriptor cache controller 107 reads a receive descriptor from the host memory 40 on the basis of the connection number provided.

Operation of the communication controller 1001 thus configured according to the second embodiment will be described below. The operation will be described with respect to an example in which an Ethernet® network is used as the network media 150.

A path for receiving packets essentially differs from a path for sending packets. Therefore they will be described separately. In the communication controller 1000 according to the first embodiment without the hash search mechanism, firmware of the network processor unit 105 would perform an operation equivalent to the hash search. Accordingly, the performance of the communication controller 1001 according to the second embodiment in which hardware supports receive processing to some extent is higher than that of the communication controller 1000 according to the first embodiment in which most of processing relies on the firmware.

(1) Receive Operation

1. The MAC controller 104 receives a packet from the network media 150.
2. The MAC controller 104 checks the Ethernet® header of the packet to see whether the destination MAC address matches the address it holds. The MAC controller 104 has a register in which the MAC address of the automatic communication controller 1001 is set. This register is set by the host (This is a well-known function of an Ethernet® communication controller 1001 and therefore the description of which is omitted herein.)
3. If the destination MAC address matches the MAC address of the communication controller 1001, the MAC controller 104 stores the received packet in a send/receive packet buffer 103.
4. At the same time, the MAC controller 104 determines which protocol the received packet complies with, classifies the packet as Ethernet®, IP Raw, TCP, or UDP, or other protocol, extracts a hash pattern corresponding to the protocol, and forwards information to the hash search engine 109. The information, called packet information, is the hash pattern plus the address of the send/receive buffer 103 in which the received packet is stored. If the protocol is IP Raw, the hash pattern will be a protocol ID. If the protocol is TCP/UDP, the hash pattern will be a source IP address, destination IP address, source port, and destination port.

5. The hash search engine 109 uses the hash pattern in the packet information to make a hash search to identify a connection ID (PCB ID), adds the ID to the packet information, and forwards it to the send/receive scheduler 106. The hash pattern and connection ID have been registered beforehand by the host (means for registering hash patterns in response to a hash pattern registration request from the host is provided in the hash search engine 109, details of which is not described herein.)

6. The send/receive scheduler 106 schedules dispatch of processing to the network processor unit 105 in response to a send request provided from the host and a receive request provided from the network media 150. In the case of a receive request, it also forwards the packet information to the network processor unit 105.

7. When the packet information is forwarded to the send/receive scheduler 106, the connection number of the received packet is provided to the descriptor cache controller 107. If descriptors with the connection number are not contained in the descriptor cache memory 108, a DMA controller 102 is activated to read and prefetch (store) descriptors with the connection ID from the host memory 40 into the descriptor cache memory 108. (At this point of time, the descriptor cache controller 107 follows a descriptor chain.) It is assumed herein that a receive descriptor chain associated with each connection number are contained in the host memory 40 and the connection number and the addresses of their associated descriptors have been notified by the host to the descriptor cache controller 107 beforehand. This is notified by using a method commonly known as Doorbell and hardware for this is also provided in this embodiment, although description of which will be omitted herein.

8. The network processor unit 105 receives the receiving processing dispatched from the send/receive scheduler 106, refers to the packet information to read the connection ID (PCB ID) and details of the received packet.

9. In order to forward the received packet stored in the send/receive packet buffer 103 to the host memory 40, the network processor unit 105 refers to receive descriptors. Receive descriptors are provided for each connection and indicate the address and size of a location in the host memory 40 in which the received packet is to be stored. The network processor unit 105 generates the address of a descriptor cache window to read on the basis of the connection number and reads the receive descriptors.

10. The descriptor cache controller 107 provides the receive descriptor, which has been prefetched at step 7 described above, to the network processor unit 105.

11. The network processor unit 105 obtains from the receive descriptor the address of the location in the host memory 40 in which the received packet to be stored and provides it to the DMA controller 102 to activate a DMA write operation. Information provided to the DMA controller 102 includes, besides the address of the location in the host memory 40, the transfer size of the received packet and the address of the send/receive buffer 103 for storing the received packet.

12. The DMA write request is provided to an I/O bus controller 101 and receive packet data in the send/receive packet buffer 103 is forwarded to the host memory 40 on the basis of the information described above.

13. In this way, the received packet is provided to the host. In practice, completion of the descriptor and the interrupt are also signaled to the host, which is not a main subject of a present invention and therefore has not been described. The completion of the descriptor is signaled by setting a done bit in a done bit field (indicated by reference number 200 in FIG. 3) of the descriptor in the host and the address of the consumed descriptor in the host memory 40 is separately indicated through signaling means to the host. The interrupt is signaled by providing the interrupt to the CPU 10 of the host to indicate that the receive descriptor has been consumed and the received packet has been transferred to the host memory 40 according to the descriptor.

14. The network processor unit 105 slides the receive descriptor cache window. This is performed because the descriptor at the beginning of the window has been consumed and is no longer required to be referred to. In fact, by doing so, the next descriptor to be used is placed in the window. This window sliding eliminates the need for the network processor unit 105 to actually follow a descriptor chain in the host memory 40.

(2) Send Operation

Send operation is opposite in direction to the receive operation and rather simpler compared with the receive operation.

1. The CPU 10 of the host stores data to send in the host memory 40 and generates receive descriptors indicating it in the host memory 40 (in the form of a descriptor chain if necessary).

2. The host CPU 10 signals a request to send by means of Doorbell. In practice, it writes in send Doorbell register in the I/O bus controller 101 a connection number, the address of a location in the host memory 40.in which the leading descriptor of a descriptor chain is stored, and the number of descriptors in the chain.

3. The send Doorbell is signaled to both of the send/receive scheduler 106 and the descriptor cache controller 107. If descriptors associated with the connection ID are not contained in the descriptor cache or if there is free space in the descriptor cache, the descriptor cache controller 107 immediately activate the DMA controller 102 to read and prefetch (store) the descriptors from the host memory 40 into the descriptor cache memory 108. (At this point of time, the descriptor cache controller 107 follows the descriptor chain.)

4. The send/receive scheduler 106 forwards the send request to the network processor unit 105. In the information mentioned above, only the connection ID is forwarded.

5. In order to provide send the send packet stored in the host memory 40 to the network media 150, the network processor unit 105 refers to send descriptors. The send descriptors are provided for each connection and indicate the address and size of a location in the host memory 40 in which the send packet is stored. The network processor unit 105 generates the address of a send descriptor cache window 900 to read on the basis of the connection number and reads the send descriptors.

6. The descriptor cache controller 107 provides the send descriptor, which has been prefetched at step 3 described above, to the network processor unit 105.

7. The network processor unit 105 obtains from the send descriptor the address of the location in the host memory 40 in which the send packet is stored and provides it to the DMA controller 102 to activate a DMA read operation. Information provided to the DMA controller 102 includes the address of the location in the host memory 40 and the transfer size of the send packet.

8. The DMA read request is provided to the I/O bus controller 101 and the send packet data is forwarded from the host memory 40 to the send/receive packet buffer 103 on the basis of the information mentioned above.

9. Then, the request to send is provided to the MAC controller 104 and the send packet in the send/receive packet buffer 103 is sent to the network media 105.

10. In this way, the send packet is provided to the host. Notification as described with respect to the receive operation is made, which is not a main subject of a present invention and therefore is not described here.

11. The network processor unit 105 slides the receive descriptor cache window in the same manner as in the receive operation.

In this way, the hash search engine 109 provided in the communication controller 1001 can be used to obtain the connection number for the received packet beforehand to prefetch the receive descriptor. The prefetch of the receive descriptors, combined with the prefetch of send descriptors, enables delay in obtaining descriptors from the host to be hidden. In addition, descriptors required by the network processor unit 105 can be provided to the network processor unit 105 when it requires them. Consequently, the performance of packet receive and send processing can be improved.

The present invention can reduce descriptor control overhead in the network processor unit. This is because the descriptor cache controller in the communication controller analyzes a chain of descriptors scattered over the host memory to build a virtual descriptor gather list and allows the network processor unit to refer to it thorough two or three types of descriptor cache windows. This eliminates the need for the network processor unit to manage and control descriptor chains on the host, resulting in the reduced descriptor control overhead.

Furthermore, the present invention can reduce delay in descriptor access by the network processor unit during communication processing. This is because the communication controller has as many descriptor caches as connections supported by the communication controller and, for sending operation, sending descriptors are prefetched at the point in time when they are indicated by the host, and for receiving operation, hash search is used to identify a connection and receive descriptors are prefetched. Thus, whenever the network processor unit is required to refer to descriptors during send or receive processing, the required descriptors are read into the descriptor cache, resulting in reduction in description access delay.

Next, a third embodiment of the present invention will be described in detail.

Figure 14:
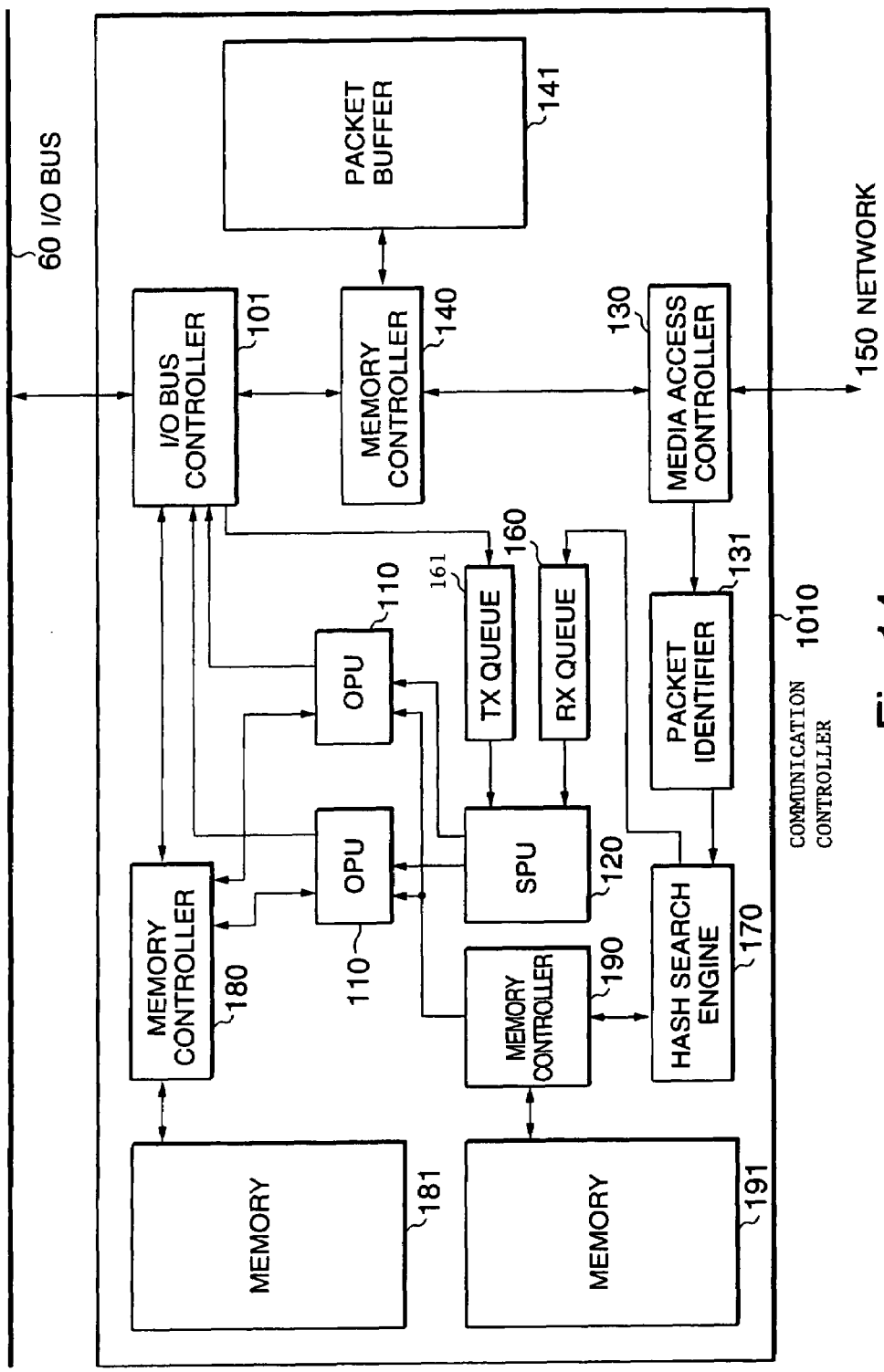
FIG. 14 shows an embodiment of a communication controller according to the present invention.

Referring to FIG. 14, a communication controller 100 includes an I/O bus controller 101, a plurality of offload processor unit (OPU) 110, a scheduler processor unit (SPU) 120, a media access controller 130, a packet identifier 131, a memory controller 140, a packet buffer 141, a Tx queue 150, an Rx queue 160, a hash search engine 170, a memory controller 180, and a memory controller 190. As such, the circuit block diagram of a system according to the third embodiment of the invention is similar to the diagram of a system according to the first embodiment of the invention shown in FIG. 1, except that the communication controller 1000 is replaced by the communication controller 1010.

The I/O bus controller 101 controls data transfer between the I/O bus 60 and the communication controller 100. The I/O bus controller 101 may be a PCI controller.

The media access controller 130 controls network media such as a Gigabit Ethernet network and is responsible for data transmission between the network 151 and the communication controller 100. The packet identifier 131 is obtained by analyzing the header of a received packet to extract information required for identifying a connection. The hash search engine 170 makes hash search for packet information.

The packet buffer 141 stores a received packet and send packet through the memory controller 140.

The Tx queue 150 is used for queuing transmission requests provided from the host. The Rx queue 160 is used for queuing the results of hash search. The scheduler processor unit 120 schedules sending and receiving on the basis of the entries in the Tx queue 150 and the Rx queue 160.

The memory controller 180 controls writing to and reading from an instruction/data memory 181 by the I/O bus controller 101 and the OPUs. The instruction/data memory 181 stores instructions and data for processors in the communication controller 100. The memory controller 190 controls writes and reads in a PCB memory 191 by the hash search engine 170 and the OPUs 110. The PCB memory 191 stores a hash table for hash search, context information specific to each connection, which is generated by the host, and other information. In the present embodiment, the context information is Protocol Control Blocks (PCBs). A PCB is generated for each connection and used in sending and receiving processing. Namely, an unique PCB is generated for each connection unit.

Each of the offload processor units 110 analyzes protocols for received packets, activates data transfer to the host memory 40, activates send data transfer, and performs sending operation for the send data. Each offload processor unit 110 includes a network processor unit.

Figure 15:
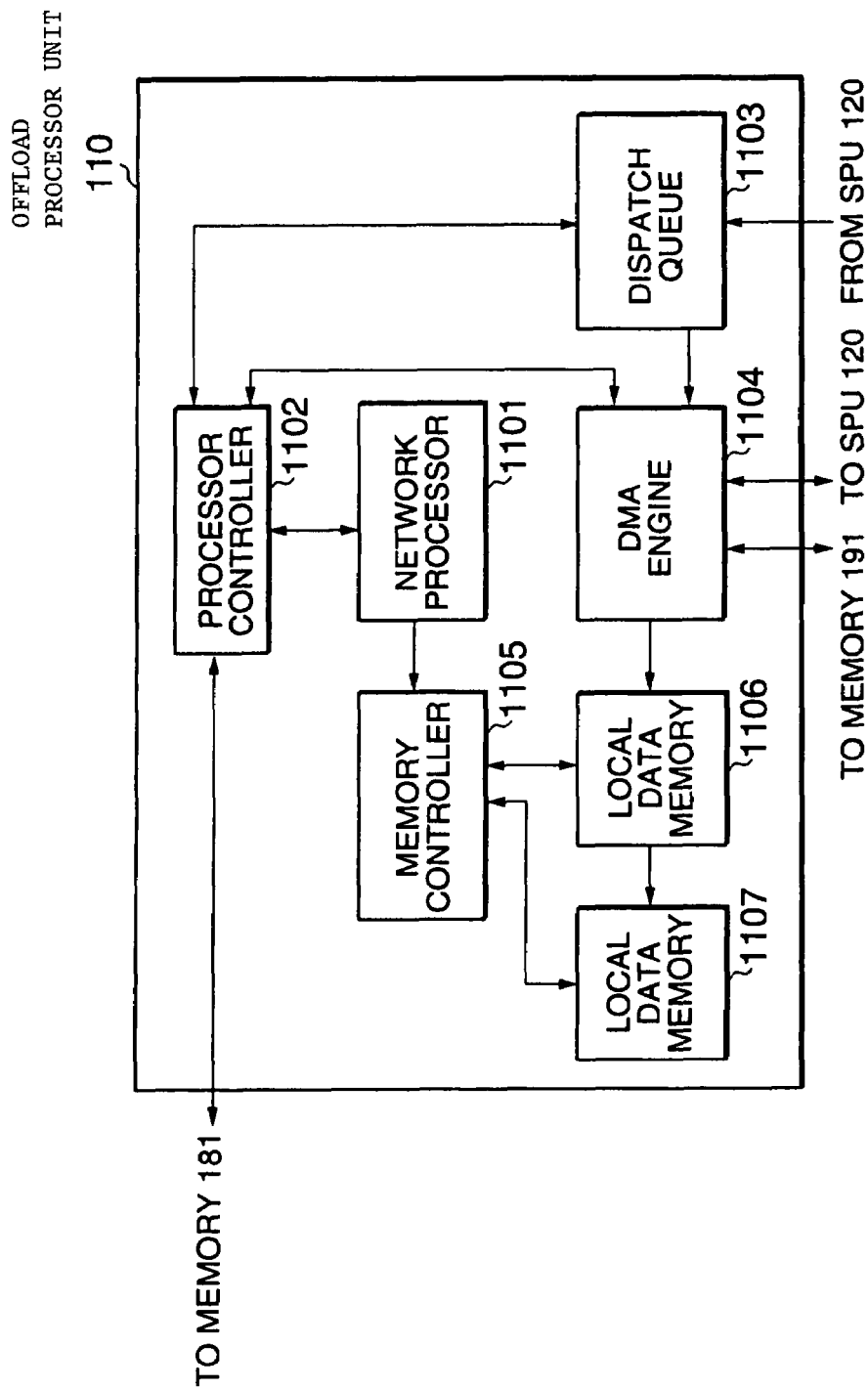
FIG. 15 shows an embodiment of a off-load processor unit 110 according to the present invention.

Referring to FIG. 15, the offload processor unit 110 includes a network processor 1101, a processor controller 1102, a dispatch queue 1103, a DMA engine 1104, a memory controller 1105, and local data memories 1106 and 1107.

The processor interface of the network processor 1101 is connected to the processor controller 1102. The processor controller 1102 has control registers and can access resources in the communication controller 100, including the instruction/data memory 181.

The memory controller 1105 controls writes and reads in the local data memories 1106 and 1107 performed by the network processor 1101. The local data memories 1106 and 1107 are 2-bank dual port memories. One port of each of the local data memories 1106 and 1107 is connected to the network processor 1101 through the memory controller 1105. The other port is connected to the DMA engine 1104. The DMA engine 1104 is connected to the PCB memory 191 and (the packet information memory 1217 of) the scheduler processor unit 120. The DMA engine 1104 can also be used by the network processor 1101 through the processor controller 1102.

Figure 16:
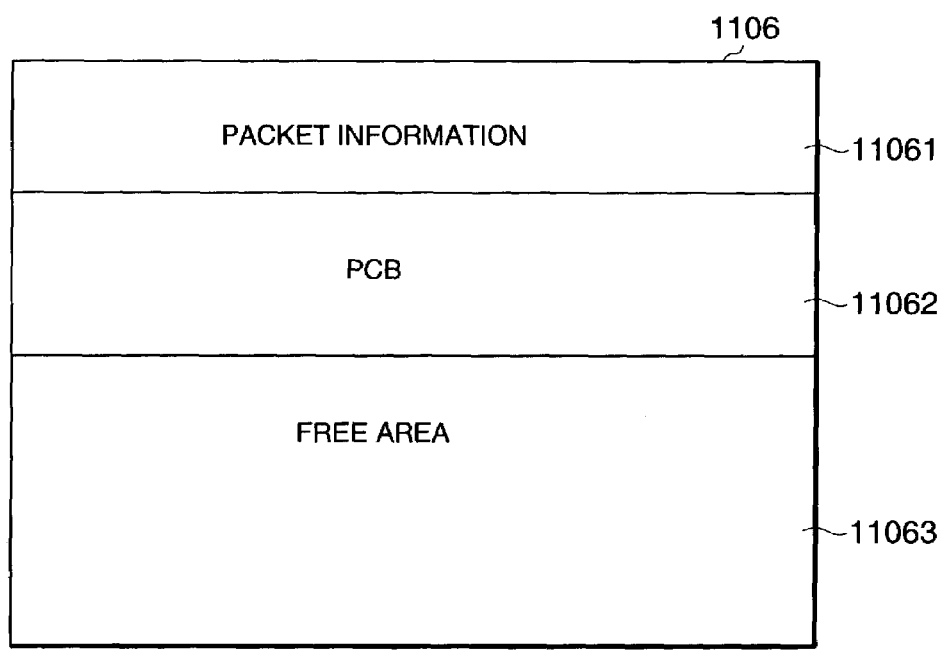
FIG. 16 shows a local data memory 1106 according to the present invention.

Referring to FIG. 16, the local data memory 1106 has an area 11061 storing packet information and an area 1162 storing a PCB.

In the present embodiment, the size of the packet information is 64 bytes and the size of the PCB ranges from 16 to 1024 bytes. The local data memory 1107 has a similar structure.

Referring FIG. 15 again, the target data memory out of the local data memories 1106 and 1107 accessed by the network processor 1101 is always controlled to be one. Only and always one of the local data memories 1106 and 1107 is accessed by the network processor 1101. No two of the plurality of banks, the local data memories 1106 and 1107, are simultaneously accessed. Switching between the banks is controlled by hardware. The network processor 1101 need not be aware of the bank switching. In particular, the bank switching is performed by the memory controller 1105. After the completion of a dispatch process, the offload processor unit 110 stores information indicating the completion of the process in the process completion register 11023. When the dispatch process completion information is written in the process completion register 11023, the memory controller 1105 makes bank switching.

When a PCBID is provided from the dispatch queue 1103, which has received a dispatch from the scheduler processor unit 120, the DMA engine 1104 reads the corresponding PCB from the PCB memory 191 and stores it in a bank of one of the local data memories 1106 and 1107 that is currently connected to the network processor 1101. (This bank will be hereinafter called a primary bank and the other bank that is currently not connected to the network processor 1101 will be called a secondary bank).

In the present embodiment, the dispatch queue 1103 consists of two entries, which number corresponds to the number of the local data memories 1106 and 1107.

The processor controller 1102 includes a dispatch queue register 11021, a DMA engine control register 11022, and a process completion register 1023.

Referring to FIG. 17, the dispatch queue register 1102 holds a dispatch state, a send or receive state, and a PCBID corresponding to each of the primary and secondary banks. The dispatch queue register 11021 continues poling while the network processor 1101 is idle.

Figure 18:
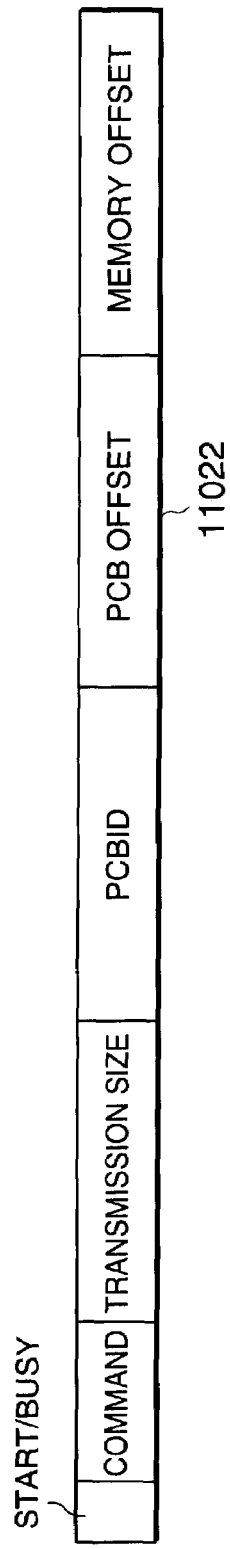
FIG. 18 shows a DMA engine control register 11022 according to the present invention.

Referring to FIG. 18, the DMA engine control register 11022 stores a start/busy bit, a read/write command, transfer size, the ID of a PCB to be transferred, an offset of PCB data, and offsets of the local data memories 1106 and 1107.

Figure 19:
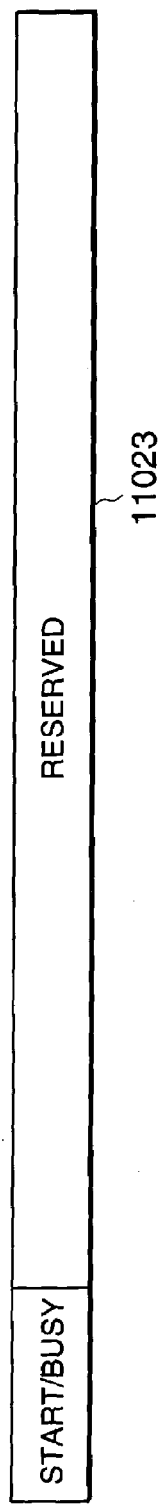
FIG. 19 shows a process completion register 11023 according to the present invention.

Referring to FIG. 19, the process completion register 11023 stores a start/busy bit.

Figure 20:
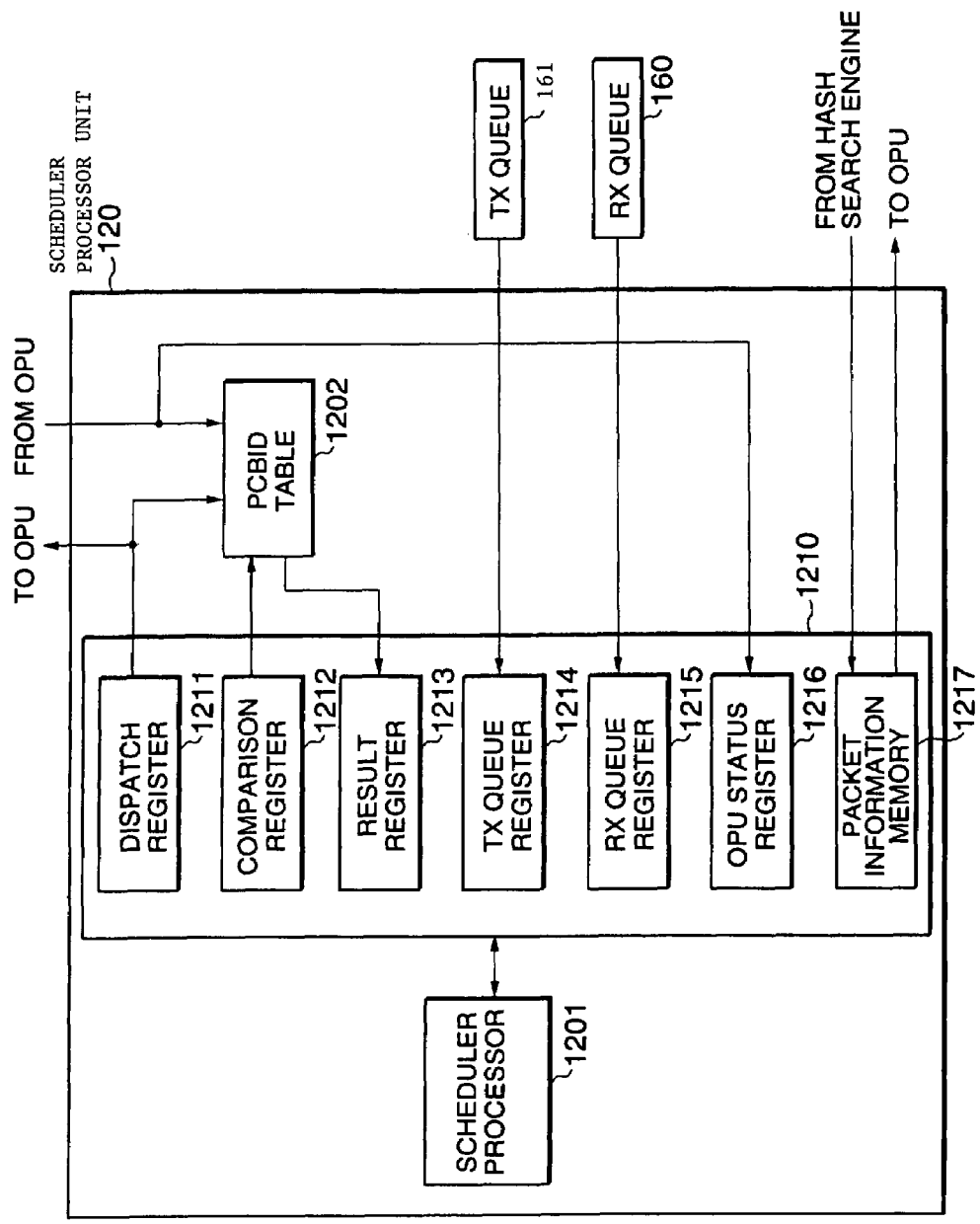
FIG. 20 shows an embodiment of a scheduler processor unit 120 according to the present invention.

Referring to FIG. 20, the scheduler processor unit 120 includes a scheduler processor 1201, a PCBID table 1202, and a processor controller 1210.

The scheduler processor 1201 is connected to the processor controller 1210. The processor controller 1210 includes a dispatch register 1211, a comparison register 1212, a result register 1213, a Tx queue register 1214, an Rx register 1215, an OPU status register 1216, and a packet information memory 1217.

Figure 21:
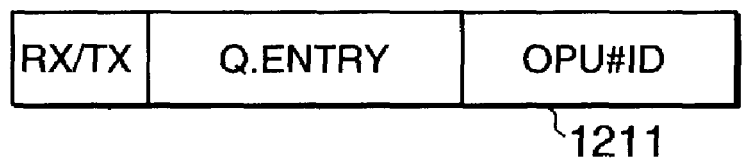
FIG. 21 shows a dispatch register 1211 according to the present invention.

Referring to FIG. 21, the dispatch register 1211 is used when a dispatch to an offload processor unit 110 is performed and contains information indicating a send or receive operation, a Q. Entry, and the ID of the offload processor 110 to which the dispatch is made. The Q. Entry indicates the address of a location in the packet information memory 1217 in which the packet information is stored.

Referring back to FIG. 20, the comparison register 1212 stores the PCBID of a packet process to be dispatched and used for comparison with the PCBID of a process already dispatched. The result register 1213 stores the result of comparison between PCBIDs. The Tx queue register 1214, which has a shift-queue structure, allows the scheduler processor 1201 to refer to the first few entries in the TX queue 150. The Rx queue register 1215, which also has a shift-queue structure, allows the scheduler processor 1201 to refer to the first few entries in the Rx queue 160. The OPU status register 1216 indicates the current processing state in the offload processor unit 110.

Referring to FIG. 22, the Rx queue register 1215 in the present embodiment is structured such that the first eight entries in the Rx queue 160 can be referred to. Each entry in the Rx queue register 1215 stores one PCBID. The Tx queue register 1214 has a structure similar to this. While the number of entries in each of the Tx queue register 1214 and the Rx queue register 1215 is eight in this embodiment, the number is not limited to this. Any number of entries can be set.

Referring to FIG. 23, the OPU status register 1216 holds the current status of the offload processor unit 110. In the present embodiment, four offload processors 110 are provided, each of which can accept two dispatches, a primary and a secondary, at a time. The OPU status register 1216 indicates which of the send and receive dispatch is currently being performed to each offload processor unit 110. The OPU status register 1216 includes four entries corresponding to the primary and four entries corresponding to the secondary. Each of the eight entries stores "00, " "01," or "10. " "00" indicates that the relevant offload processor unit 110 is idle. "01" indicates that the relevant offload processor unit 110 is performing a receive operation. "10" indicates that the relevant offload processor unit 110 is performing a send operation.

The OPU status register 1216 is referred to not only for obtaining load status on each offload processor unit 110. It is also referred to when the scheduler processor unit 120 makes a dispatch, in order to balance between sending and receiving processes across the plurality of offload processor units 110. The control for such balancing can be achieved in this embodiment as follows, for example. Two of the offload processor units 110 may be chosen to be receive only and the other two offload processor units 110 may be chosen to be sent only. The scheduler processor unit 120 may perform dispatching in such a manner that these conditions are met.

Referring back to FIG. 20, when a packet process for a PCBID has been dispatched to an offload processor unit 110 and a dispatch factor (packet process) occurs for the same PCBID, the dispatch factor must be dispatched to the same offload processor unit 110. For that purpose, the scheduler processor 1201 compares all the PCBID of a packet process to be dispatched with all the PCBIDs of processes currently dispatched to the offload processor units 110 and dispatches the dispatch factor to the offload processor unit 110 to which the process associated with the same PCBID has been dispatched. Processing time required for this comparison depends on the number of the offload processor units 110 and the number of dispatches that they can accept. The comparison is the most execution-time-intensive part in the dispatching processing performed by the scheduler processor unit 120. In a communication controller having a plurality of network ports, requests to send and requests to receive may be provided from the plurality of the ports simultaneously. The communication controller according to the present invention includes a plurality of offload processor units 110 as shown in FIG. 14 and therefore has the capability of processing packets for a plurality of send and receive requests in parallel with each other. The scheduler processor unit 120 dispatches packet processes for a plurality of send and receive requests equally to the plurality of offload processor units 110 for load balancing. However, the communication controller has the one and only scheduler processor unit 120. This means that the single scheduler processor unit 120 is responsible for all dispatching. In the present embodiment, the dispatching is performed serially in the scheduler processing unit 120, which may become a bottleneck in the performance of the communication controller.

In order to separately support to the PCBID comparison process, which is the most time-intensive and critical process for the performance, by hardware, the PCBID table 1202 is provided in the scheduler processor unit 120. The PCBID table 1202 holds off the PCBIDs for packet processes dispatched by the scheduler processor unit 1201 to the offload processor units 110. When the completion of a process is signaled from an offload processor unit 110, the PCBID associated with it is cleared from the table. The PCBID table 1202 includes, for each of the plurality of the offload processor units 110, as many entries as entries in the dispatch queue 1103 of the offload processor unit 110. In the present embodiment, two entries, a primary entry and a secondary entry, are provided for each offload processor unit 110 because the number of entries of the dispatch queue 1103 is two. In particular, when a PCBID for a packet process to be dispatched is set in the comparison register 1212, a comparator compares the value in the comparison register 1212 with all the PCBID values in the PCBID table 1202 and the number of an offload processor unit 110 to which the process associated with the same value has been dispatched is stored in the result register 1212. More particularly, the PCBID table 1202 has a comparator associated with each entry. In the present embodiment, the PCBID table 1202 contains eight comparators because the number of the offload processor units 110 is four and the depth of the dispatch queue 1103 of each offload processor unit 110 is two, that is, the primary and the secondary. When the PCBID in the comparison register 1212 is inputted into the PCBID table 1202, it is compared with the PCBIDs of all the entries in the PCBID table 1202 at a time and a bit of the entry that has the same PCBID is set and returned. The comparison by the hardware is completed in one clock. It would take for a scheduler processor 1201 program in the schedule unit 120 to perform this high-load process. Thus, the execution time can be significantly reduced.

Figure 24:
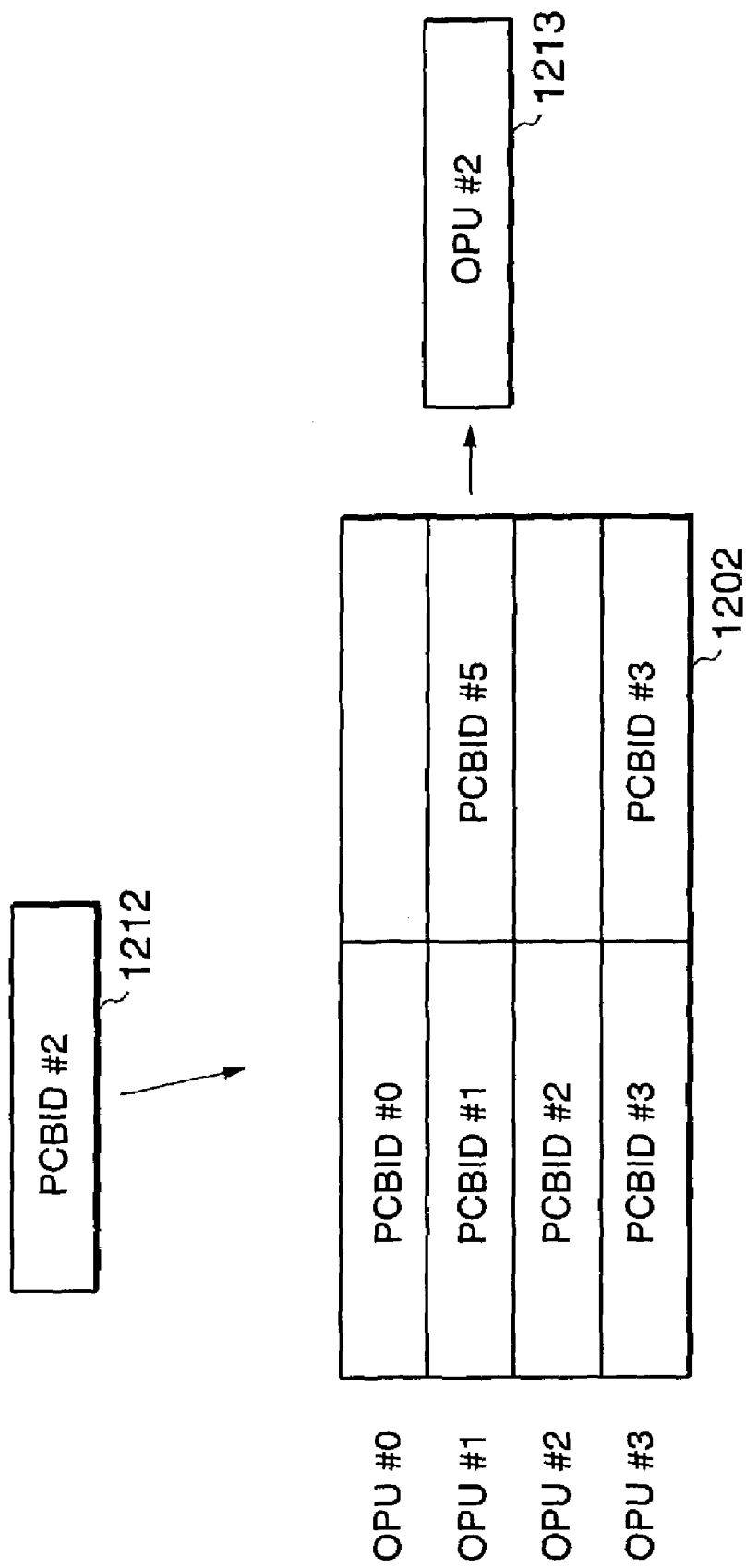
FIG. 24 shows a dispatch process according to the present invention.

Referring to FIG. 24, the PCBID table 1202 of the present embodiment at a certain time indicates that a packet process concerning a connection with PCBID#0 is dispatched to the primary of an offload processor unit 110 with OPU#0. A packet process concerning a connection with PCBID#1 is dispatched to the primary of an offload processor unit 110 with OPU#1 and a packet process concerning a connection with PCBID#5 is dispatched to its secondary. A packet process concerning a connection with PCBID#2 is dispatched to the primary of an offload processor unit 110 with OPU#2. A packet process concerning a connection with PCBID#3,is dispatched to the primary of an offload processor unit 110 with OPU#3 and a packet process concerning a connection with PCBID#3 is dispatched to its secondary.

The packet information memory 1217 contains packet information. The scheduler processor unit 120 has a circuit that transfers packet information in response, to a request from the network processor 1101. The packet information contained in the packet information memory 1217 is transferred to the offload processor units 110.

Operations of the present invention will be described below with reference to the drawings.

An operation until a request for a send process is queued in order for the host to send a packet to the network 150 will be described first.

Referring to FIG. 1, the host sends a request to send to the communication controller 100. The host sends a PCBID as the connection number of this communication to the I/O bus controller 101. The I/O bus controller 101 sends the PCBID to the Tx queue 150. The TX queue 150 queues the send request.

Next, an operation until a request for a receive process in order for the host to receive a packet from the network will be described.

Referring to FIG. 14, the host registers matching patterns and PCBIDs associated with them in a hash table in the PCB memory 191 in advance. For example, if the protocol type used is TCP used in a network such as the Internet, source and destination IP addresses and source and destination port IDs are registered in the hash table as the hash matching patterns.

Protocols and rules for matching patterns to be registered are specified as specifications for the communication controller 100. Details of the rules are not directly related to the present invention and therefore the description of which will be omitted herein.

The media access controller 130 receives a packet from the network. The media access controller 130 takes the packet directed to the communication controller 100 to which it belongs from the network. The packet received at the media access controller 130 is passed through the packet identifier 131 section and analyzed to determine its protocol and to extract matching pattern according to the matching pattern rules. The matching pattern extracted is provided as packet information to the hash search engine 170 and hashing is used to search the hash table stored in the PCB memory 191. If the hash searching does not provide a match, the connection is assumed to be an unregistered connection. If the search provides a match, a PCBID identifying the connection is written in the packet information and queued in the Rx queue 160.

An operation performed by the scheduler processor unit 120 for dispatching send/receive request packet processes to a plurality of offload processor units 110 will be described below.

Referring to FIG. 20, the scheduler processor 1201 poles the Tx queue register 1214 and the Rx queue register 1215 to determine whether or not there are dispatch factors. Tx queue register 1214 and the Rx queue register 1215 allow the first few entries in the Tx queue 150 and the Rx queue 160, respectively. They are shift queues in which entries can be skipped or overtaken. The scheduler processor 1201 refers to entries in each of the Tx queue register 1214 and the Rx queue register 1215, starting at the top, to perform dispatching. In order to prevent contention for a shared resource among a plurality of offload processor units 110, the scheduler processor unit 120 should not dispatch packet processes with the same PCBID to different offload processor units 110. This is because when the offload processor units 110 perform processes for each connection, they should access a PCB that holds information about that connection in the PCB memory 191. Thus, the scheduler processor unit 120 must ensure the exclusiveness of dispatches. The scheduler processor unit 120 allocates any communication process related with a first communication unit of the communication processes to the first one of the offload processor units 110 and any communication process related with a second communication unit of the communication processes to the second one of the offload processor units 110. If a packet process for a PCBID has already been dispatched to an offload processor unit 110, any dispatch factor (packet process) for the same PCBID should be dispatched to the same offload processor unit 110. Therefore, the schedule processor 1201 compares a PCBID associated with a packet process to be dispatched with all PCBIDs associated with packet processes that have been dispatched to the offload processor units 110 and dispatches the dispatch factor (packet process) to a offload processor unit 110 to which a packet process associated with the same PCBID has been dispatched.

In the example shown in FIG. 24, PCBID#2 for the packet process to be dispatched that is set in the comparison register 1212 is compared with the PCBIDs in all the entries in the PCBID table 1202. PCBID#2 stored in the primary entry of the offload processor unit 110 with OPU#2 matches PCBID#2 for the process to be dispatched that is set in the comparison register 1212. Therefore, the PCBID table 1202 stores OPU#2 in the result register 1212.

Figure 25:
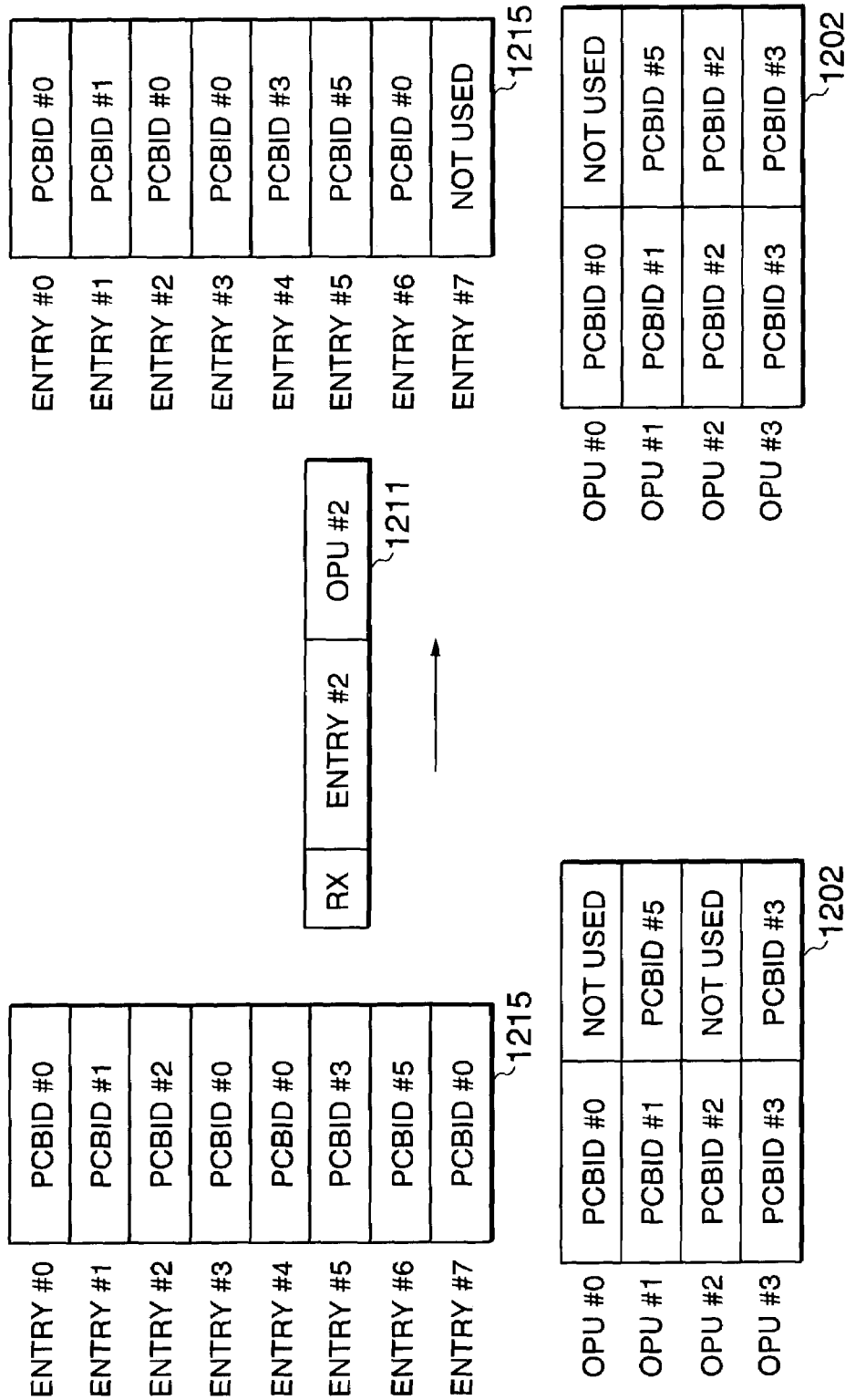
FIG. 25 shows a dispatch process according to the present invention.

Referring to FIG. 25, OPU#2 is stored in the dispatch register 1211 in order to dispatch the packet process with PCBID#2 to the offload processor unit 110 with OPU#2. In this example, information (Rx) indicating a receive packet process is also stored. PCBID#2 in entry #2 is dequeued from the RX queue register 1215 and the subsequent entries are shifted. PCBID#2 is stored in the secondary entry corresponding to the offload processor unit 110 with OPU#2 in the PCBID table 1202.

Next, a dispatch process according to the present invention will be further described.

Figure 26:
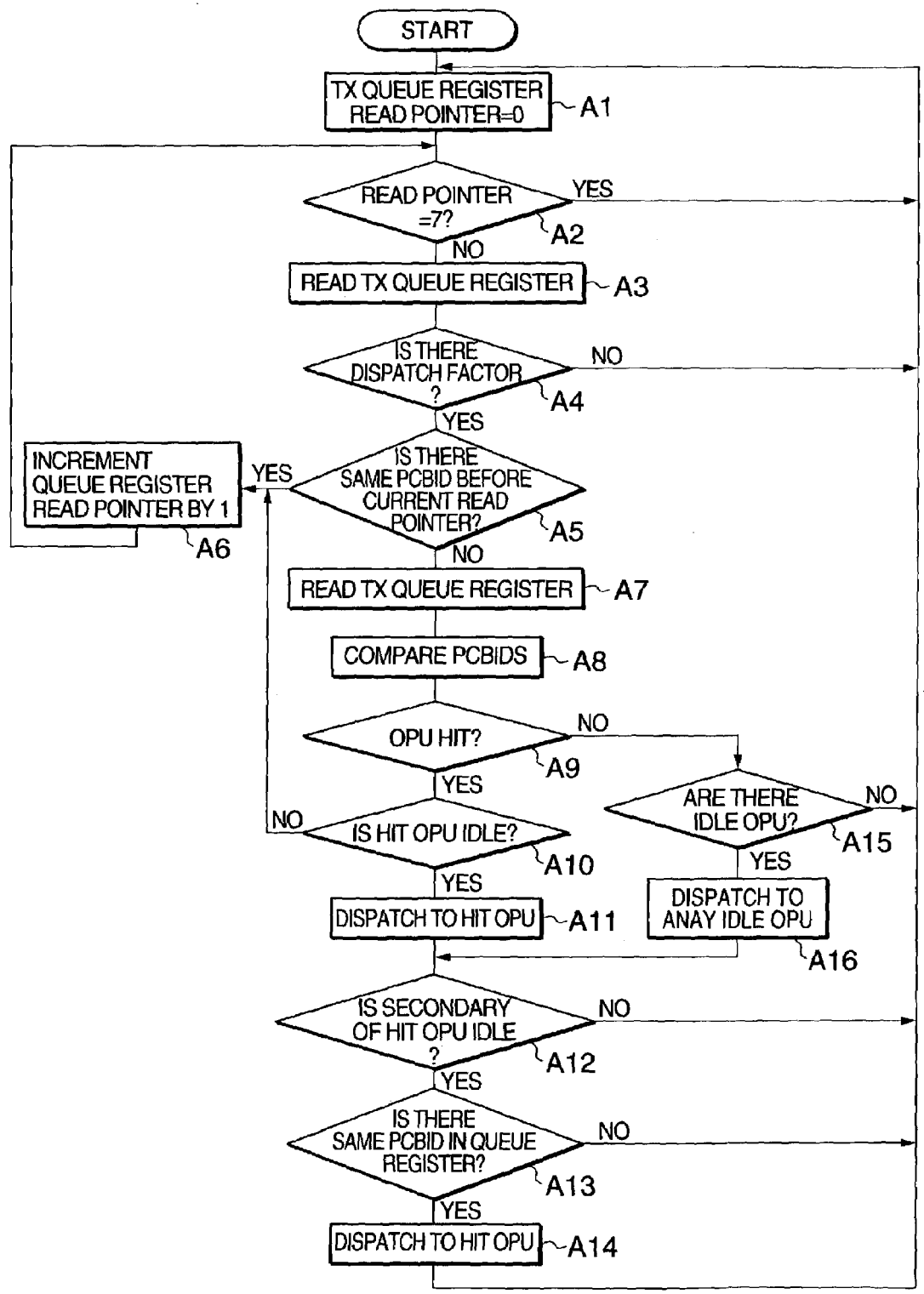
FIG. 26 shows a flow of a dispatch process according to the present invention.

Referring to FIGS. 15, 20, and 26, packet processes with the same PCBID are preferably dispatched to the same offload processor unit 110 at a time in the communication controller according to the present invention. This allows an offload processor unit 110 to obtain a PCB simply by copying between banks of the two local data memories 1106 and 1107, rather than reading it from the PCB memory 191 each time needed. Furthermore, if the offload processor unit 110 indicated in the resulting register 1212 has already accepted two dispatches and is processing them, that is, it is not idle, then the offload processor unit 110 skips one entry in the Tx queue register 1214 and refers to the next entry, and so on. However, the sequence of processes in the same connection must be ensured. Therefore, when a packet process with the same PCBID as that of a packet process that has been skipped appears, it also should be skipped. After continuing to skip and referring to all the eight-entry Tx queue register 1214, the offload processor returns to the top and repeats the same process. The Tx queue register 1214 is refilled as required.

At step A1, the processor controller 1210 sets a read pointer of the Tx queue register to 0. The scheduler processor 1201 determines whether or not the read pointer of the Tx queue register is 7 (step A2). If it is 7, then the process returns to step A1. If the read pointer of the Tx queue register 1214 is not 7, the scheduler processor 1201 uses the read pointer to read the Tx queue register 1214 (step A3). At step 4, the scheduler processor 1201 determines whether there is a dispatch factor (packet process). If there is no dispatch factor (packet process), then the process returns to A1. On the other hand, if there is a dispatch factor (packet process), the scheduler processor 1201 checks all the read pointers preceding the current read pointer to determine whether there is the same PCBID as that of the dispatch factor (packet process) (step A5). If it determines that there is the same PCBID, the scheduler processor 1201 increments the read pointer of the Tx queue register 1214 and returns to step A2. If it determines at step A5 that there is not the same PCBID, the scheduler processor 1201 reads the Tx queue register 1214 (step A7) and compares the PCBIDs it read with the PCBIDIDs in the PCBID table 1202 (step A8). At step A9, the scheduler processor 1201 determines whether or not an offload processor unit 110 to which the process should be dispatched is hit in this comparison. That is, the scheduler processor 1201 determines whether or not an offload processor unit 110 is hit on the basis of whether or not the number of that offload processor unit 110 is stored in the result register 1212.

If the offload processor unit 110 is hit at step A9, the scheduler processor 1201 determines whether or not the offload processor unit 110 is idle (step A10). If the hit offload processor unit 110 is not idle, the process proceeds to step A6. On the other hand, if the hit offload processor unit 110 is idle at step A1, the scheduler processor dispatches the packet process to the offload processor unit 110 (step A11). The scheduler processor 1201 determines whether or not the hit secondary entry of the offload processor unit 110 (to which the process has just been dispatched) is idle (step A12). If the secondary entry is not idle, the process returns to step A1. If on the other hand the secondary entry is idle, the scheduler processor 1201 determines whether or not there is a dispatch factor with the same PCBID as the current PCBID in the Tx queue register 1214 (step A13). If there is a dispatch factor with the same PCBID, the scheduler processor 1201 also dispatches the dispatch factor to the offload processor unit 110 to which it has dispatched the process at step A11 (step A14). On the other hand, if there is not a dispatch factor with the same PCBID, the process returns to step A1.

If the offload processor unit 110 is not hit at step A9, the scheduler processor 1201 is not hit at step A9, the scheduler processor 1201 determines whether or not there are idle offload processor units 110 (step A15). If there are idle offload processor units 110, the scheduler processor 1201 dispatches the process to any one of the one or more idle offload processor units 110 at step A16. On the other hand, if it determines at step A15 that there are no idle offload processor units 110, that is, none of the plurality of offload processor units 110 is idle, the process returns to step A1.

While only the Tx queue register 1214 has been described, the Tx queue register 1214 and the Rx queue register 1214 are referenced alternately in order to balance between send and receive processing. Dispatching through reference to the Rx queue register 1215 is performed in a similar way.

Figure 27:
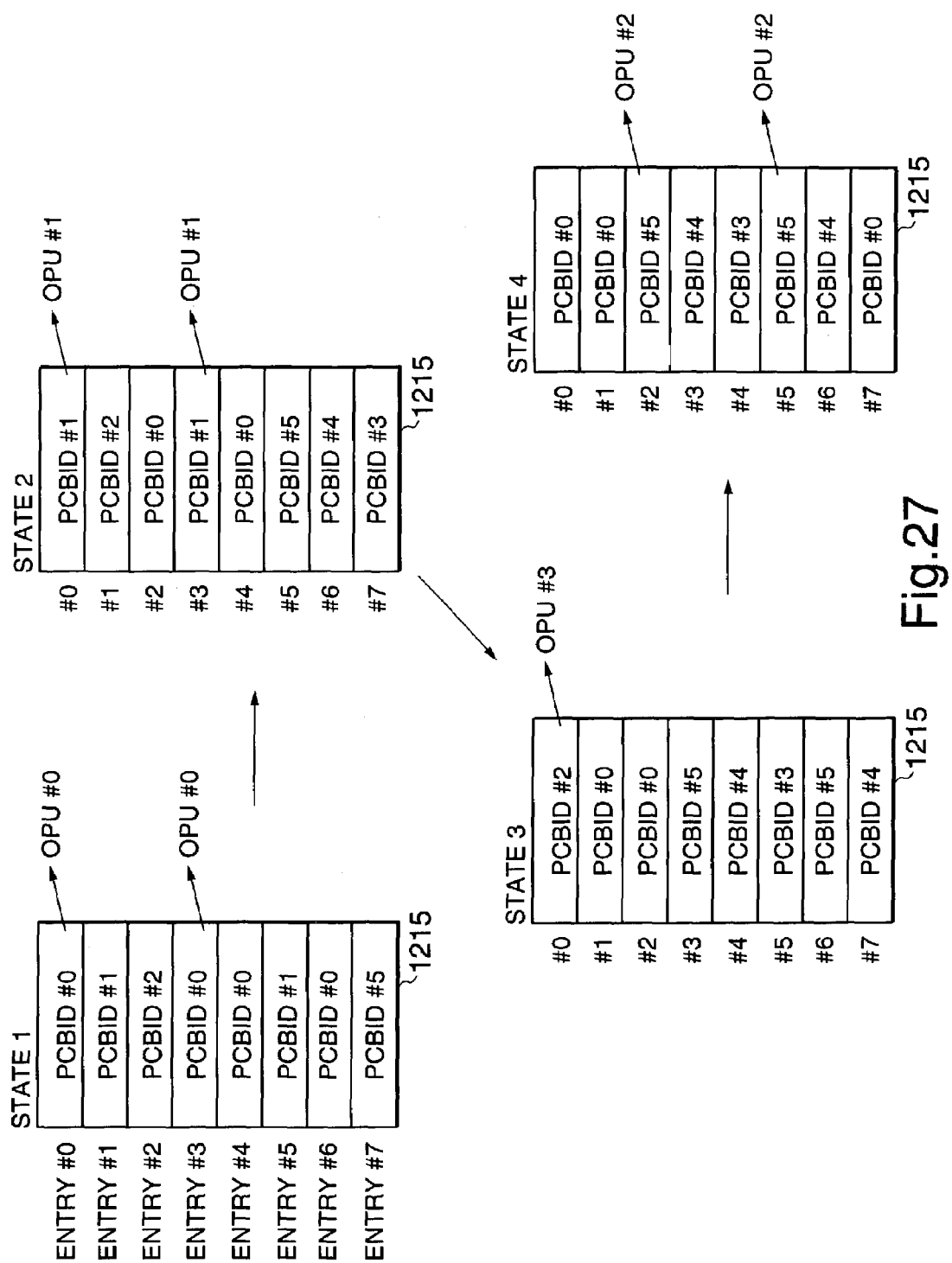
FIG. 27 shows a dispatch process according to the present invention.

FIG. 27 shows an example of the operation of the Rx queue register 1215 that is performed by following the flowchart shown in FIG. 26. It is assumed here that one process with PCBID#2 has been dispatched to only an offload processor unit 110 with OPU#3 and being processed. That is, a PCBID, namely PCBID#2 is stored in only the primary entry of OPU#3 in the PCBID table 1202.

In state 1, PCBID#0 in entry#0 at the top is read and compared with all the entries in the PCBID table 1202. No offload processor unit 110 is hit in the comparison. Consequently, the process with PCBID#0 is dispatched to a given idle offload processor unit 110, which is the offload processor unit 110 with OPU#0, which is an idle offload processor unit. The same PCBID, PCBID#0, is in a subsequent entry#3 in the Tx queue register 1214 and the offload processor unit 110 with OPU#0 can accept one more dispatch. Therefore, PCBID#0 in entry#3 is also dispatched to the offload processor unit 110 with OPU#0.

In state 2, PCBID#1 in entry#0 is read and dispatched to the offload processor unit 110 with OPU#1 as in state 1. The same PCBID, PCBID#1 in subsequent entry#3, is also dispatched to the offload processor unit 110 with OPU#1.

In state 3, PCBID#2 in entry#0 is read and compare with all the entries in the PCBID table. As a result, an offload processor unit 110 with OPU#3 is hit. The packet process with PCBID#2 is dispatched to the offload processor unit 110 with OPU#3. No more PCBID#2s are stored in the subsequent entries in state 3. Even if one were stored, it could not be dispatched in this example because one packet process with PCBID#2 has already been dispatched to the offload processor unit with OPU#3.

In state 4, PCBID#0 in entry#0 is read and compares with all the entries in the PCBID table and the offload processor unit 110 with OPU#0 is hit. However, the two packet processes have dispatched to it in state 1 and not yet been completed. Therefore, no more processes can be dispatched to the offload processor unit 110 with OPU#0. Even if the read point of the Tx queue register is incremented to read entry#1, entry#1 cannot be dispatched because of the dispatch rule in step A5 in the flowchart in FIG. 26 that the same PCBID should exist before the current read pointer. (This restriction is intended to ensure the sequence of processes for the same connection.) Therefore, the top two entries are skipped and PCBID#5 in entry#2 is selected and dispatched to an offload processor unit 110 with OPU#2, which is idle.

Next, an operation performed by an offload processor unit 110 to which a send/receive, process is dispatched will be detailed.

Referring to FIG. 15, when the scheduler processor unit 120 dispatch a process to the offload processor unit 110, the address of a location of the packet information memory 1217 in the scheduler processor unit 120 in which packet information is stored is enqueued in the dispatch queue 1103. The DMA engine 1104 reads the packet information from the packet information memory 1217 of the scheduler processor unit 120 and stores it in a primary bank of the local data memories 1106 and 1107. In the case of packet transmission operation, a connection number is set as the packet information. That is, in the case of packet transmission operation, there is only a PCBID and no packet information. However, the offload processor unit 110 accesses packet information in the packet information memory 1217 in order to obtain a PCBID whether in transmission or reception operation. Therefore, the PCBID information is transferred as packet information to the offload processor unit 110 in the transmission operation. For packet reception, the packet information is 64 byte of integrated information about a received packet, which includes header information, a PCBID, and the store address of a packet buffer among other information.

When the PCBID is indicated by the dispatch queue 1103 to which the dispatch is made from the scheduler processor unit 120, the DMA engine 1104 reads a PCB associated with the PCBID from the PCB memory 191 and stores it in the primary bank.

Referring to FIGS. 15 and 16, the DMA engine 1104 further reads the PCB itself on the basis of the PCBID set in the packet information and stores it in the primary bank of the banks of the local data memories 1106 and 1107. When the packet information/PCB and all information required by the network processor 1101 during sending/receiving operation are stored in the local data memories 1106 and 1107, a dispatch completion indication is stored in fields of the dispatch queue register 11021 that correspond to the primary bank shown in FIG. 17. In particular, the dispatch completion is indicated by writing a primary valid and a primary PCBID in the dispatch queue register 11021.

Figure 28:
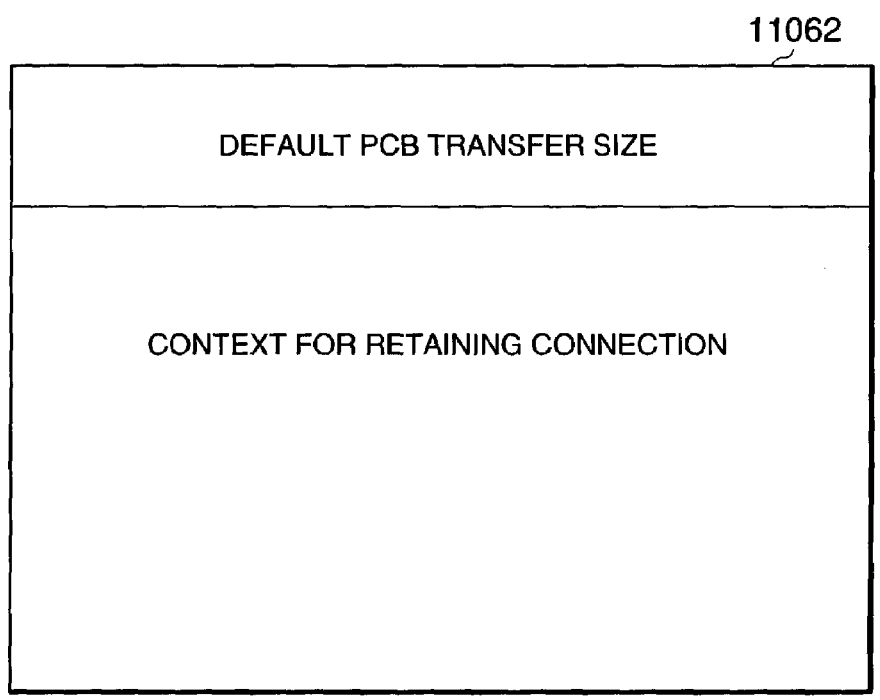
FIG. 28 shows PCB data 11062 according to the present invention.

In order to optimize the transfer size of the PCB, the data transfer length data read through DMA during dispatching is set at the beginning of PCB data 11062 shown in FIG. 28 when the host generates the PCB. The PCB data 11062 is an area 11062 in the local data memory 1106 for storing a PCB, shown in FIG. 16. At the same time the PCB data is start to be read, the memory controller 190 of the PCB memory 191 holds the specified transfer length and, when the specified transfer length is reached, stops the data transfer to the DMA engine. Typically, the transfer length is the size of PCB data required for processing in processing in the network processor 1101. If the subsequent PCB data is required, the network processor 1101 uses the DMA engine control register 11022 shown in FIG. 18 to directly control the DMA engine 1104 to allow the PCB data to be read. The transfer size value can be rewritten by the network processor 1101 at any time so that PCB data transfer according to circumstances is made.

When another dispatch is received from the scheduler processor unit 120 while the network processor 1101 is accessing the PCB in the primary bank and performing sending/receiving operation, the DMA engine 1104 transfers packet information and PCB data to a secondary bank in a manner similar to that in the transfer to the primary bank, and set a dispatch completion indication in fields corresponding to the secondary bank. More particular, the completion of dispatch is indicated by storing a secondary valid and a secondary PCBID are stored in the dispatch queue register 11021. After the completion of the sending/receiving operation in the primary bank by the network processor 1101, information indicating the completion is written in the process completion register 11023 shown in FIG. 19 and bank switching is made to replace the primary bank and secondary bank with each other. In order to write back the processed PCB data in the primary-turned-secondary bunk into the PCB memory 191, the DMA engine 1104 is automatically activated and the PCB data is written into the PCB memory 191 through DMA. At the same time, the information in the secondary in the dispatch queue register 11021 is transferred to the primary.

Figure 29:
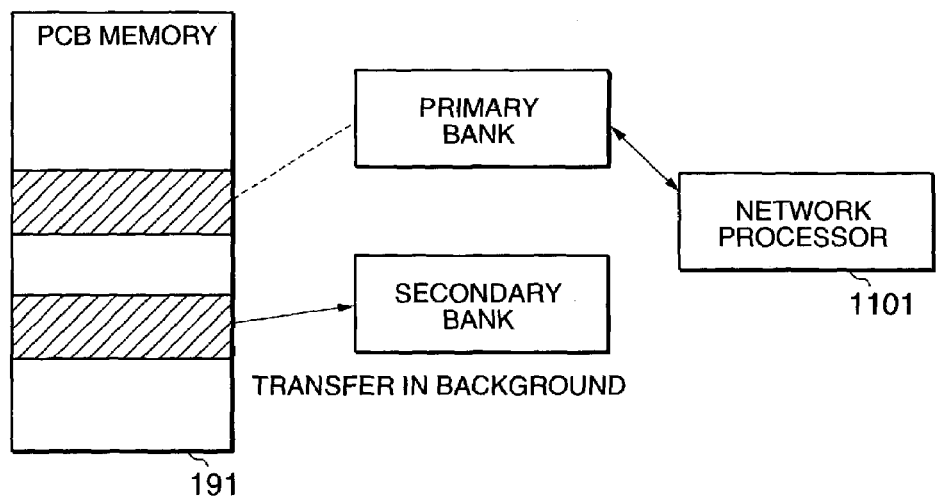
FIG. 29 shows context information transfer according to the present invention.

Referring to FIG. 29, the next PCB data to be processed is transferred from the PCB memory 191 to the secondary bank while the process in the primary bank is being performed.

Figure 30:
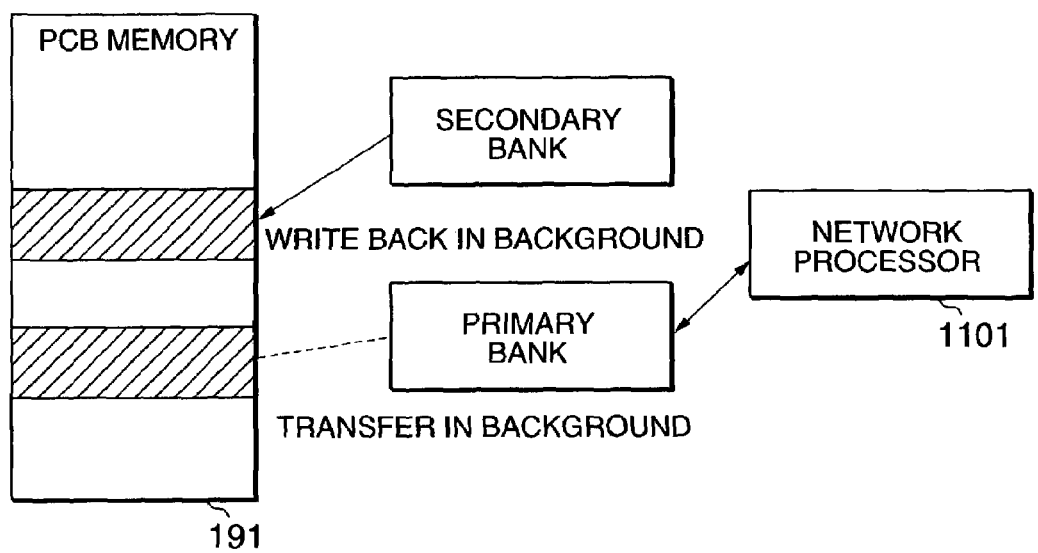
FIG. 30 shows context information transfer according to the present invention.

Referring to FIG. 30, the PCB data is in the secondary bank at the time when the banks are switched with each other with the completion of the process in the primary bank. Thus, delay in the PCB data transfer is hidden. The PCB data in the primary-turned-secondary bank is written back to the PCB memory 191 in the background of the data transfer from the primary bank.

Figure 31:
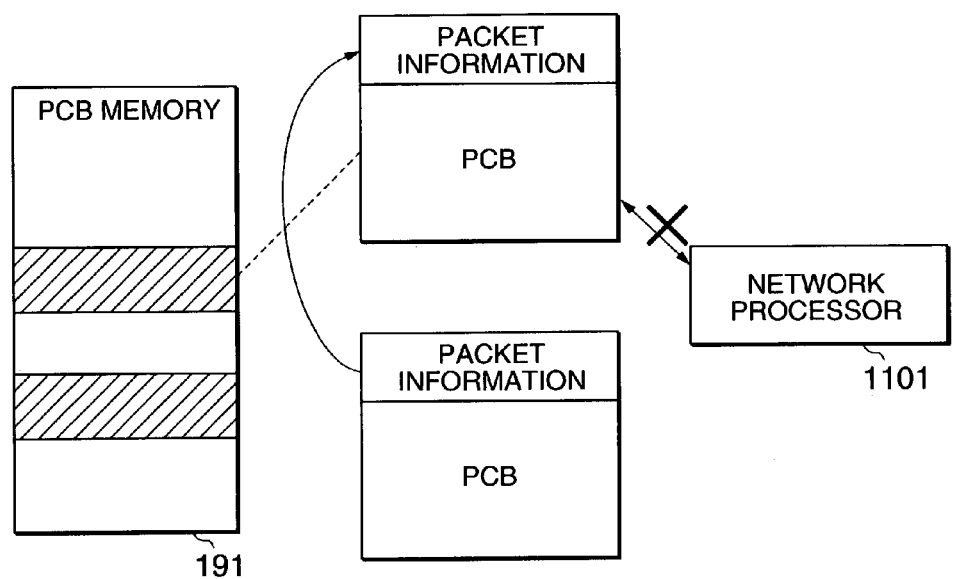
FIG. 31 shows context information transfer according to the present invention.
Figure 32:
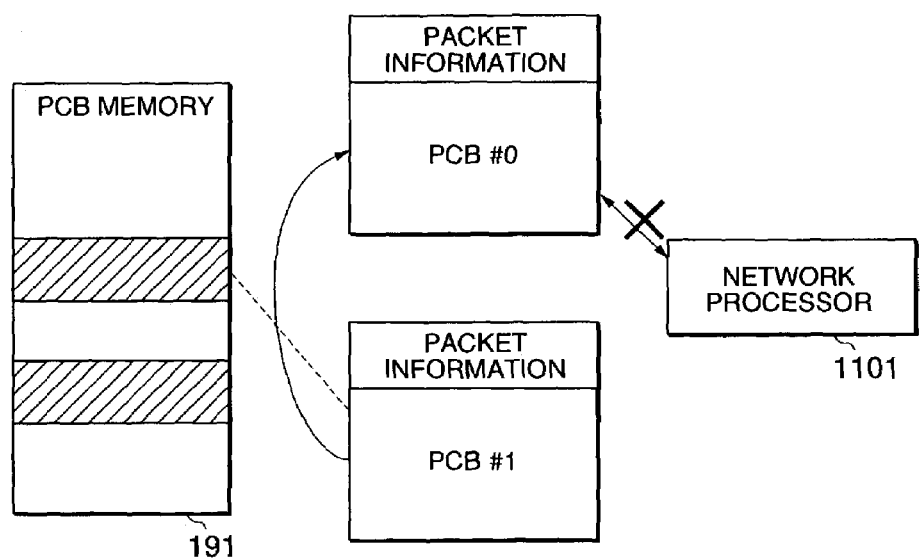
FIG. 32 shows context information transfer according to the present invention.

If the same PCBID has been dispatched to both of the primary bank and the secondary bank, packet information is copied from the secondary bank to the primary bank on the completion of the process in the primary bank, as shown in FIG. 31, without performing bank switching. PCB data is not transferred from the PCB memory 191. Instead, PCB data already contained in the primary bank continues to be used.

Referring to FIGS. 15 and 19, a busy bit is set in the process completion register 11023 to prevent the network processor 1101 from accessing the local data memories 1106 and 1107 during the bank-to-bank copy. The X in FIG. 31 indicates that the access is prevented during the bank-to-bank copy.

Furthermore, during send/receive operation by the network processor 1101, it may require other PCB data closely related to a PCB currently processed. In such a case, the network processor 1101 specifies the required PCBID in the DMA engine control register 11022 and perform a DMA read. If the specified PCBID matches a PCBID stored in the secondary bank, the PCB data contained in the secondary bank is copied to the primary bank as shown in FIG. 20, rather than transferring PCB data from the PCB memory 191.

According to the present embodiment, faster access to PCB data can be achieved and contention for access to the PCB memory 191 can be prevented by providing a plurality of network processors 110 in the communication controller 100 and copying context information for each connection to the local memories 1106 and 1107 close to the network processors 1101, as described above.

Furthermore, the local memories 1106 and 1107 have a multi-bank structure according to the present embodiment. Thus, delay in PC data transfer can be prevented by the reading PCB data into a secondary bank in advance and writing back PCB data processed from the secondary bank.

Moreover, in the present embodiment, when the same PCB is dispatched or PCB data in the secondary bank is read, the data is copied between banks of the local data memories 1106, 1107. Thus, access load to the PCB memory 191 can be reduced and, as a result, PCB data can be optimized and the throughput of the network processors 1101 can be efficiently improved.

As described above, a plurality of first processors for performing data transmission and reception processing and a second processor for dispatching transmission and reception processing to the first processors are provided according to the present invention. Thus, processing for transmitting and receiving data to and from a network can be performed by the plurality of processors to reduce time required for the transmission and reception processing.

In addition, according to the present invention, the second processor has a table indicating transmission/reception processing currently being performed in the plurality of first processors and includes comparison means for comparing a unit of transmission/reception processing to be newly allocate to a processor with those already assigned to the plurality of first processors to determine whether there is a match. If the unit of processing is the same as the one assigned to any of the first processors, the second processor dispatches the new unit of transmission/reception to that firs processor. Thus, the transmission/reception processing involved in the same connection can be dispatched with consistency.

Furthermore, the comparison means is implemented by hardware. Thus, exclusive dispatch control, which would otherwise take long time can be performed in a short period of time. In addition, a program for the second processor can be simplified and speeded up, enabling fast dispatching.

Moreover, the second processor according to the present invention includes a send queue register and a receive queue register which contains the top few entries of queues and has shift queue form that allows entries to be skipped. Thus, each connection can be controlled exclusively and transmission/reception processes ready for dispatch can be dispatched first. That is, the sequence of processes for the same connection can be ensured and the number of idle network processors can be minimized, thereby enabling efficient load balancing of network processing.

According to the present invention, local data memories dedicated to network processors are provided close to them and context information (PCB data) is copied to the local data memories when network processes are dispatched to the network processors. Thus, the network processors can quickly obtain the context information required for sending/receiving packets according to the present invention.

According to the present invention, a local data memory includes a plurality of banks. While a process is performed in one bank, the next context information (PCB data) to be processed can be transferred to another bank. Furthermore, PCB data processed and completed is write back from a secondary bank, which is not being used for processing, to a PCB memory according to the present invention. Consequently, the present invention also provides the advantages that context information (PCB data) is available in the local data memory whenever it is required by the network processor and therefore delay in context information transfer to the network processor can be avoided.

According to the present invention, the transfer size of a minimum portion of context information (PCB data) required is set at the top of the context information (PCB data) to allow that only the portion of the size to be transferred during dispatching. The transfer size can be altered by a network processor at any time. Therefore, according to the present invention, information (a portion of PCB data that includes information about exception handling) that is not normally required is not transferred and only context information (PCB data) required is transferred to an appropriate network processor. Consequently, context information (PCB data) transfer load on the memory storing the context information (PCB data) can be optimized.

The scheduler processor in the present invention makes exclusive switching on the basis of PCBIDs to dispatch processes with the same PCBID is transferred successively to the same network processor. In that case, only packet information is copied from one bank to another. Context information (PCB data) is reused in the same bank without being read from the PCB memory. As a result, the amount of context information (PCB data) transferred to and from the PCB memory is reduced, further reducing delay in the context information (PCB data) transfer.

While this invention has been described in conjunction with the preferred embodiments described above, it will now be possible for those skilled in the art to put this invention into practice in various other manners.

What is claimed is:

1. A communication controller which is connected to a host through an I/O bus and which controls network media on the basis of a descriptor indicated from said host to communicate a packet, said communication controller comprising:
    a processor which performs communication processes;
    a descriptor cache mechanism which makes a virtual descriptor gather list by following and analyzing a descriptor chain in a host memory from said descriptor indicated from said host, and which allows said processor to refer to a portion of said virtual descriptor gather list in a descriptor cache window; and
    a descriptor cache control register that includes a first data field provide a start/busy indication for indicating activation of a direction to slide a window, a second data field providing a direction to slide the window, and a third data field for indicating whether the numeric window slide mode or the direct window slide mode is to be provided,
    wherein said descriptor cache mechanism provides, as modes of sliding the descriptor cache window, a numeric window slide mode in which the window is slid by a specified size and a direct window slide mode in which the window is directly moved to a specified descriptor position.

2. The communication controller according to claim 1, wherein the numeric window slide mode is provided when the third data field of the descriptor cache control register is set to a first state, and wherein the direct window slide mode is provided when the third data field of the descriptor cache control register is set to a second state different from the first state.

3. The communication controller according to claim 2, wherein descriptor cache control register further includes a fourth data field that stores an offset value used for setting a slide side during operation of the numeric slide mode.

* * * * *